(12) United States Patent
Matsuyama et al.

(10) Patent No.: US 10,193,159 B2
(45) Date of Patent: Jan. 29, 2019

(54) CURRENT COLLECTOR FOR SECONDARY BATTERY AND SECONDARY BATTERY USING THE SAME

(75) Inventors: Chizuru Matsuyama, Yokohama (JP); Yasuyuki Tanaka, Ayase (JP); Takashi Honda, Yokosuka (JP); Shigeo Ibuka, Ebina (JP); Yoshiaki Nitta, Yokohama (JP); Satoru Ichikawa, Yokosuka (JP); Manabu Kaseda, Tokyo (JP); Tomoya Kubota, Yokohama (JP); Haruyuki Saito, Yokohama (JP); Keisuke Shimamoto, Isehara (JP); Kana Sato, Ebina (JP); Yukinari Kato, Yokohama (JP); Hideaki Horie, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1045 days.

(21) Appl. No.: 13/263,241

(22) PCT Filed: Apr. 9, 2010

(86) PCT No.: PCT/JP2010/056452
§ 371 (c)(1),
(2), (4) Date: Oct. 6, 2011

(87) PCT Pub. No.: WO2010/117060
PCT Pub. Date: Oct. 14, 2010

(65) Prior Publication Data
US 2012/0034521 A1 Feb. 9, 2012

(30) Foreign Application Priority Data

Apr. 9, 2009 (JP) .................................. 2009-095196
Oct. 30, 2009 (JP) .................................. 2009-251112

(51) Int. Cl.
*H01M 4/66* (2006.01)
*H01M 10/0525* (2010.01)
(Continued)

(52) U.S. Cl.
CPC ........... *H01M 4/668* (2013.01); *H01M 4/661* (2013.01); *H01M 4/667* (2013.01);
(Continued)

(58) Field of Classification Search
CPC ...... H01M 4/661; H01M 4/667; H01M 4/668; H01M 10/0525; H01M 10/0583; H01M 10/0585; Y02T 10/7011; Y02E 60/122
(Continued)

(56) References Cited

U.S. PATENT DOCUMENTS 5,800,946 A 9/1998 Grosvenor et al.
6,432,585 B1 * 8/2002 Kawakami .............. C23C 18/31
429/209

(Continued)

FOREIGN PATENT DOCUMENTS

CN 1985400 A 6/2007
JP 2006-512722 A 4/2006
(Continued)

OTHER PUBLICATIONS

European Extended Search Report, dated May 13, 2014, 6 pages.

*Primary Examiner* — Gary D Harris
(74) *Attorney, Agent, or Firm* — Foley & Lardner LLP

(57) ABSTRACT

A current collector for a secondary battery (1) of the present invention includes a resin layer (2) having electrical conductivity, and an ion barrier layer (3) provided on the surface of the resin layer (2). The ion barrier layer (3) contains ion trapping particles (6) in which metal compounds (5) are provided on the surfaces of metal containing particles (4). The ion trapping particles (6) are continuously provided (Continued)

from an interface (7) between the resin layer (2) and the ion barrier layer (3) toward a surface (3a) of the ion barrier layer (3). Thus, the ion barrier layer (3) prevents from the entry of ions, so that the ion adsorption in the current collector (1) can be decreased.

22 Claims, 7 Drawing Sheets

(51) Int. Cl.
*H01M 10/0583* (2010.01)
*H01M 10/0585* (2010.01)

(52) U.S. Cl.
CPC .... *H01M 10/0525* (2013.01); *H01M 10/0583* (2013.01); *H01M 10/0585* (2013.01); *Y02T 10/7011* (2013.01)

(58) Field of Classification Search
USPC ........................................................ 429/211
See application file for complete search history.

(56) References Cited

U.S. PATENT DOCUMENTS

| | | |
|---|---|---|
| 6,933,077 B2 | 8/2005 | Sudano et al. |
| 2002/0102464 A1* | 8/2002 | Yoshida ................ H01G 9/038 429/300 |
| 2004/0126663 A1 | 7/2004 | Sudano et al. |
| 2005/0014643 A1 | 1/2005 | Lini et al. |
| 2005/0079409 A1* | 4/2005 | Andelman .......... C02F 1/46109 429/94 |
| 2006/0127773 A1* | 6/2006 | Kawakami ............ H01M 4/134 429/245 |
| 2008/0118840 A1* | 5/2008 | Yew ........................ B82Y 30/00 429/231.5 |
| 2008/0220330 A1 | 9/2008 | Hosaka et al. |
| 2009/0081550 A1* | 3/2009 | Inoue .................... H01M 4/362 429/223 |
| 2009/0146604 A1* | 6/2009 | Choi et al. ..................... 320/101 |
| 2010/0243964 A1* | 9/2010 | Lee .......................... H01B 1/02 252/503 |

FOREIGN PATENT DOCUMENTS

| | | |
|---|---|---|
| JP | 2006-190649 A | 7/2006 |
| JP | 2007-335206 A | 12/2007 |
| JP | 2008-140552 A | 6/2008 |
| JP | 2008-192364 A | 8/2008 |
| RU | 2003 119 081 A | 1/2005 |
| WO | WO 2006/061696 A2 | 6/2006 |

* cited by examiner (a)

(b)

CURRENT COLLECTOR FOR SECONDARY BATTERY AND SECONDARY BATTERY USING THE SAME

TECHNICAL FIELD

The present invention relates to a current collector for a secondary battery and a secondary battery using the same. More particularly, the present invention relates to a current collector for a secondary battery including a resin layer having electrical conductivity, which is capable of effectively preventing ionic permeability and achieving a reduction in weight, and relates to a secondary battery using the same.

BACKGROUND ART

In recent years, advances are being made in the development of a hybrid electric vehicle (HEV), an electric vehicle (EV), and also a fuel cell vehicle. With regard to these kinds of so-called electric vehicles, it is necessary to utilize a power supply unit capable of repeating charge and discharge. Examples of the power supply unit include a secondary battery such as a lithium ion battery and a nickel hydrogen battery, and an electric double layer capacitor. In particular, a lithium ion secondary battery is considered to be favorable for an electric vehicle because of high energy density and high durability against repeated charge and discharge. Thus, developments are being promoted with respect to various types of secondary batteries. It is to be noted that, in order to apply a secondary battery to a power supply for driving a motor used in the above-mentioned various types of vehicles, a plurality of secondary batteries connected in series are required to ensure high output power.

However, when batteries are connected to each other via a connector, output is decreased because of electrical resistance of the connector. In addition, the batteries including the connector are disadvantageous in a spatial aspect. In other words, the connector causes a decrease in output density or energy density in the batteries.

For the solution of such a problem, advances are being made in the development of a bipolar secondary battery such as a bipolar lithium ion secondary battery. The bipolar secondary battery has a configuration in which a plurality of bipolar electrodes, each of which is provided with a positive electrode active material layer formed on one side of a current collector and a negative electrode active material layer formed on the other side, are stacked on top of each other via an electrolyte layer or a separator.

The current collector used in the bipolar secondary battery as described above is preferably made from a material that is more lightweight and has excellent electrical conductivity in order to ensure large output density. Therefore, a current collector has been proposed in recent years, which is composed of a polymer material to which an electrically conductive material is added instead of conventional metal foil. For example, Patent Literature 1 discloses a current collector, in which metal particles or carbon particles are mixed in a polymer material as an electrically conductive material, and resin having electrical conductivity is contained.

CITATION LIST

Patent Literature

Patent Literature 1: Japanese Patent Unexamined Publication No. 2006-190649

SUMMARY OF INVENTION

However, the current collector as described in Patent Literature 1 has a low barrier property in lithium ions in an electrolysis solution as compared with a current collector of metal foil. Thus, it is recognized that when such a current collector is applied to a bipolar lithium ion secondary battery, the lithium ions may penetrate into the current collector of the bipolar battery and remain adsorbed in the current collector. The adsorbed lithium ions are not easily released. As a result, the capacity of the battery may decrease.

The present invention has been in view of such a conventional problem. It is an object of the present invention to provide a current collector for a secondary battery including a resin layer having electrical conductivity, which can suppress an adsorption of ions in the current collector.

A current collector for a secondary battery according to an aspect of the present invention includes a resin layer having electrical conductivity, and an ion barrier layer provided on a surface of the resin layer. The ion barrier layer contains ion trapping particles in which metal compounds are provided on surfaces of metal containing particles. The ion trapping particles are continuously provided from an interface between the resin layer and the ion barrier layer toward a surface of the ion barrier layer.

BRIEF DESCRIPTION OF DRAWINGS

FIG. 1($b$) is a schematic cross-sectional view showing another example of a current collector according to an embodiment of the present invention.

FIG. 2($b$) is an X-ray photoelectron spectrum of titanium atoms in titanium nitride after applying voltage.

DESCRIPTION OF EMBODIMENTS

Figure 1:
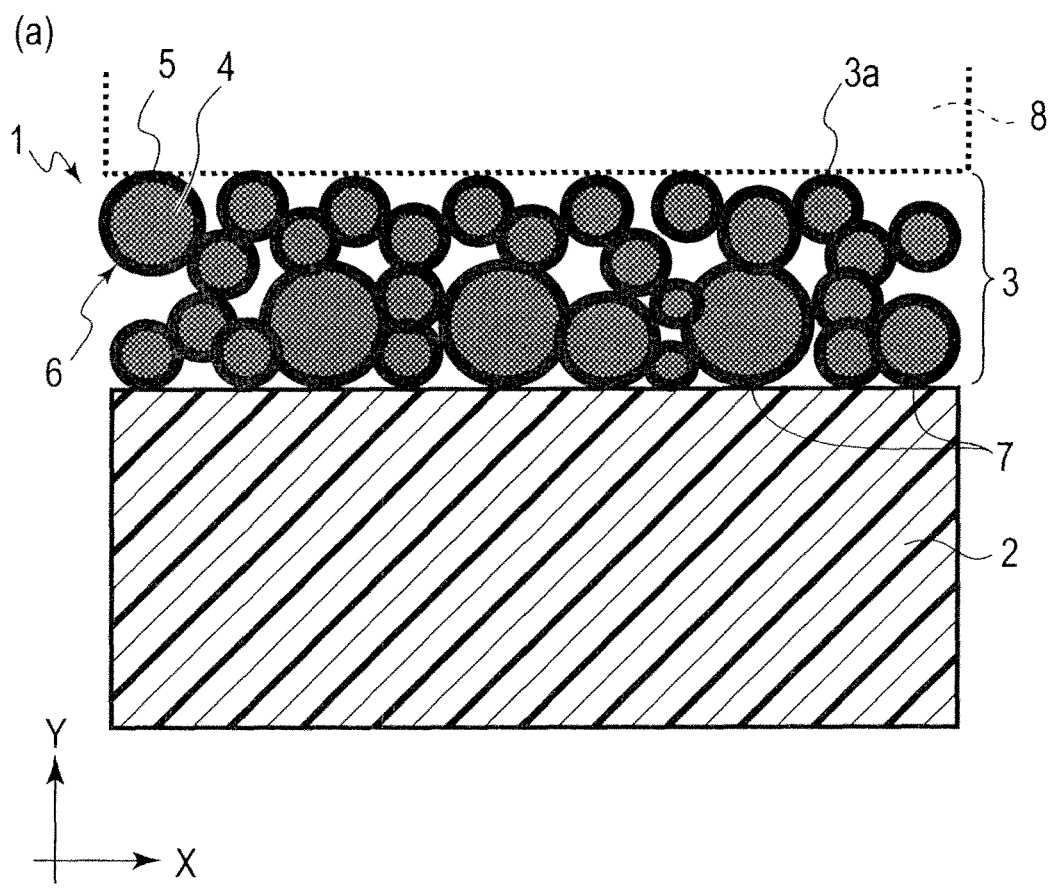
FIG. 1($a$) is a schematic cross-sectional view showing one example of a current collector according to an embodiment of the present invention.
Figure 1:
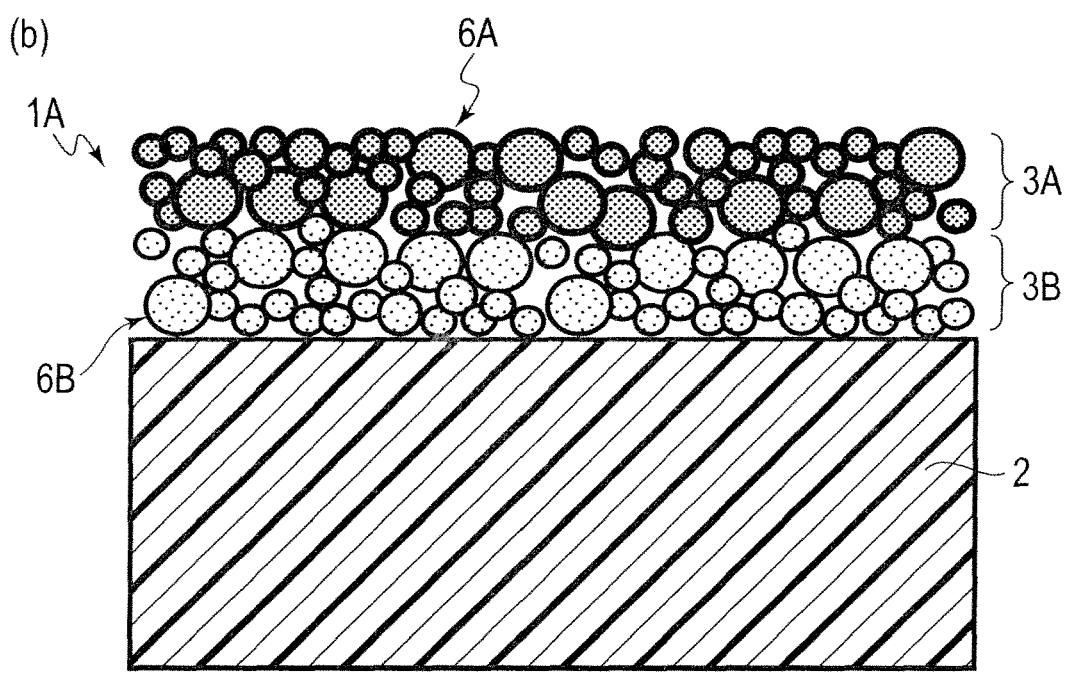

A description will be made below in detail of a current collector for a secondary battery and a secondary battery using the current collector according to the present invention with reference to the drawings. Note that, the dimensional ratios in the drawings are exaggerated for convenience of explanation, and may be different from the actual ratios. In addition, the description will be made mainly in the case where the current collector for a secondary battery according to the present invention is used for a lithium ion secondary battery for convenience of explanation.

[Current Collector for Secondary Battery]

A current collector for a secondary battery 1 according to an embodiment of the present invention includes a resin layer 2 having electrical conductivity, and an ion barrier layer 3 provided on the surface of the resin layer 2, as shown in FIG. 1. The ion barrier layer 3 includes ion trapping particles 6, each of which includes a metal compound 5 provided on the surface of a metal containing particle 4. The ion trapping particles 6 are continuously provided from an interface 7 between the resin layer 2 and the ion barrier layer 3 toward a surface 3a of the ion barrier layer 3.

More specifically, as shown in FIG. 1, the ion barrier layer 3 includes a plurality of the ion trapping particles 6. The ion trapping particles 6 are continuously connected to each other from the interface 7 in which the resin layer 2 is in contact with the ion barrier layer 3 toward the surface 3a of the ion barrier layer 3 on the opposite side of the interface 7. In the embodiment shown in FIG. 1, the surface 3a on the opposite side of the interface 7 is in contact with an electrode (a positive electrode or a negative electrode) 8. Due to such a configuration, an electrically-conductive pass is formed from the interface 7 to the surface 3a, so that electrical conductivity is ensured from the electrode 8 to the resin layer 2. In addition, the ion trapping particles 6 in the ion barrier layer 3 prevent ions (for example, lithium ions) moving between a positive electrode and a negative electrode via an electrolyte layer from penetrating the inside of the resin layer 2. Therefore, due to the provision of the ion barrier layer 3, adsorption of the ions to the inside of the current collector 1 is prevented.

The ion trapping particles 6 constituting the ion barrier layer 3 include the metal containing particles 4, each of which is located in the central portion of the respective ion trapping particles, and are provided with the metal compounds 5 on the surfaces of the metal containing particles 4. The metal compounds 5 interact with lithium ions so as to adsorb the lithium ions at the time of charge. Therefore, the lithium ions penetrating the ion barrier layer 3 from the electrode 8 do not easily reach the resin layer 2. In addition, an ionization tendency in the metal compounds 5 becomes high at the time of discharge, so that the metal compounds 5 release the lithium ions. Consequently, since the metal compounds 5 reversibly adsorb and release ions, and the ions relating to the battery reaction are not substantially decreased, the discharge capacity can be maintained.

In the case of a lithium ion battery, when foreign substances such as iron powder are mixed into a separator, an internal short-circuit is caused. In other words, the foreign substances mixed into the separator produce heat when chemical change energy in the positive electrode and the negative electrode is changed to electrical energy. As a result, the separator is melted. When the separator is melted, insulation between the positive electrode and the negative electrode cannot be maintained, and therefore, heat is further produced. In the case in which the ion barrier layer is composed of metal particles having high electrical conductivity, an electric current flows in a plane direction (the X direction in FIG. 1). Accordingly, heat production inside the battery is further promoted.

However, since electrical resistance of the metal compounds 5 in the ion trapping particles 6 is higher than that of pure metal, electrical resistance of the current collector in a plane direction (the X direction in FIG. 1) becomes high. Therefore, even when an internal short-circuit is caused, a concentration of the electric current on the short-circuit site along the plane direction of the current collector is prevented, and an increase in temperature inside the battery can be prevented. As described below, a thickness of the ion barrier layer 3 is preferably within a range of 50 nm to 1000 nm. Thus, even when electrical resistance of the metal compounds 5 is higher than that of pure metal, electrical conductivity in the Y direction is ensured, and there is less influence on the battery property. Thus, although the electric current flows in the Y direction at the time of charge and discharge, the electric current does not easily flow in the plane direction. Accordingly, both electrical conductivity and safety at the time of short circuit can be achieved.

Hereinafter, the ion barrier layer and the resin layer constituting the current collector according to the present embodiment will be explained.

(Ion Barrier Layer)

As described above, the ion barrier layer 3 includes the ion trapping particles 6 in which the metal compounds 5 are provided on the surfaces of the metal containing particles 4. The ion barrier layer 3 may be deposited so as to cover the entire surface of the resin layer 2, or may cover a part of the surface of the resin layer 2. The ion barrier layer 3 may also be provided on one surface of the resin layer 2, or may be provided on both surfaces of the resin layer 2. Further, the ion barrier layer 3 may contain other substances, in addition to the ion trapping particles 6, for preventing the intrusion of lithium ions into the inside of the resin layer 2, or may contain only the ion trapping particles 6.

Each metal compound 5 is required to be provided at least at a part of the surface of the metal containing particle 4. However, from the viewpoint of ensuring electrical resistance in the plane direction of the ion barrier layer 3, the metal compounds 5 preferably cover the entire surfaces of the metal containing particles 4. Preferable examples of the metal containing particles 4 inside the ion trapping particles 6 include pure metal particles composed of a single metallic element, alloy particles composed of several metallic elements, or metal compound particles composed of a metallic element and a nonmetallic element. The metal containing particles preferably contain at least one metallic element selected from the group consisting of copper (Cu), nickel (Ni), titanium (Ti) chromium (Cr), platinum (Pt) and gold (Au). In other words, the metal containing particles 4 may be pure metal particles composed of at least one metallic element selected from the group consisting of copper, nickel, titanium, chromium, platinum and gold, or may be alloy particles containing these metallic elements. The metal containing particles 4 may also be metal compound particles containing these metal particles and nonmetallic elements. The above-mentioned metallic elements have high voltage stability even under a low voltage condition such as several tens of mV in the case where a carbon material is used as a negative electrode active material. Therefore, since an elution of metal in the ion barrier layer 3 is suppressed, an exposure of the resin layer 2 can be prevented. As a result, penetration of lithium ions to the resin is prevented, and therefore, deterioration of the battery can be prevented.

When the metal containing particles 4 are metal compound particles, the metal compound particles preferably contain at least one compound selected from the group consisting of a metal oxide, a metal nitride, a metal carbide, a metal sulfate, a metal phosphate and a metal phosphorous compound. More specifically, an oxide, a nitride, a carbide, a sulfate, a phosphate or a phosphorous compound of at least one metallic element selected from the group consisting of copper, nickel, titanium, chromium, platinum and gold may be used for the metal compound particles.

As for the metal compounds 5, a compound that adsorbs lithium ions at the time of charge and releases the lithium ions at the time of discharge is used. Therefore, the metal compounds 5 preferably contain at least one compound selected from the group consisting of a metal oxide, a metal nitride, a metal carbide, a metal sulfate, a metal phosphate and a metal phosphorous compound. More specifically, an oxide, a nitride, a carbide, a sulfate, a phosphate or a phosphorous compound of at least one metallic element selected from the group consisting of copper, nickel, titanium, chromium, platinum and gold may be used for the metal compounds 5. These metal compounds interact with lithium ions and adsorb the lithium ions at the time of charge. Therefore, the lithium ions do not easily reach the resin layer. That is, unpaired electrons or unshared electron pair of oxygen atoms (O), nitrogen atoms (N) or phosphorous atoms (P) present in the oxide, nitride or phosphide of these metallic elements have negative electric charge, and the lithium ions have positive electric charge. Thus, when the oxide, the nitride or the phosphide is used for the metal compounds 5, the electrical mutual interaction with the lithium ions particularly becomes strong. Therefore, it is considered that the lithium ions can be adsorbed effectively.

Particularly, the metal oxide is preferably used for the metal compounds 5. More specifically, it is preferable to use an oxide of at least one metallic element selected from the group consisting of copper, nickel, titanium, chromium, platinum and gold. The metal oxide easily interacts with the lithium ions. Therefore, it is considered that the lithium ions are attracted and stabilized on the metal compounds 5.

In addition, it is particularly preferable that the metal containing particles 4 be particles composed of copper, titanium or chromium, and the metal compounds 5 be composed of an oxide of the metallic element constituting the metal containing particles 4. More specifically, the metal containing particles 4 are preferably copper (Cu), and the metal compounds 5 are preferably copper oxide (copper(I) oxide ($Cu_2O$), copper(II) oxide (CuO)). Copper(I) oxide ($Cu_2O$) in the subnanometer oxide layer (the metal compounds 5) present on the surface layer of the copper particles of the metal containing particles 4 interacts with the lithium ions so as to form a stable middle layer. Thus, it is considered that the lithium ions do not easily reach the resin layer 2.

Moreover, the metal containing particles 4 are preferably titanium (Ti), and the metal compounds 5 are preferably titanium oxide ($TiO_2$). A 2p orbital of oxygen atoms in titanium oxide is a vacant orbital, or there are unpaired electrons having negative electric charge in the 2p orbital. Therefore, it is considered that the vacant orbital or the unpaired electrons attract the lithium ions so as to stabilize the lithium ions on the metal compounds 5. In addition, as represented by lithium titanate ($LiTiO_2$, $Li_4Ti_5O_{12}$) that may be a negative electrode active material, titanium oxide has good stability with lithium. Therefore, it is considered that titanium oxide present on the uppermost surface forms a composite compound together with the lithium ions, so as to prevent the lithium ions from reaching the resin layer 2.

Further, the metal containing particles 4 are preferably chromium (Cr), and the metal compounds 5 are preferably chromium oxide ($Cr_2O_3$). It is also considered that chromium oxide adsorbs the lithium ions due to the same mechanism as in the case of copper oxide and titanium oxide described above.

In addition, the metal containing particles 4 may be metal compound particles, and the metal compound particles and the metal compounds 5 in the ion trapping particles 6 may be formed of the same material. In other words, the whole ion trapping particles 6 may be formed of the above-described metal oxide, metal nitride, metal carbide, metal sulfate, metal phosphate or metal phosphorous compound. Even such ion trapping particles 6 can ensure a lithium ion adsorption capacity on the surfaces thereof. In addition, even when the whole metal containing particles are the metal oxide or the metal nitride, electrical conductivity in a stacking direction can be maintained since the thickness of the ion barrier layer 3 is extremely thin. As a result, there is almost no influence on the battery property.

Particular examples of the ion trapping particles 6 in which the whole metal containing particles are metal compounds include particles of copper oxide ($Cu_2O$), titanium oxide ($TiO_2$) and chromium oxide ($Cr_2O_3$). Other examples include particles of copper nitride ($Cu_3N$), titanium nitride (TiN) and chromium, nitride (CrN). In addition, particles of copper phosphide ($Cu_3P$), titanium phosphide (TiP) and chromium phosphide (CrP) may be used. Further, particles of nickel oxide (NiO), nickel nitride (NiN) and nickel phosphide (such as $Ni_3P$) are also preferable.

Moreover, the metal compounds 5 in the ion trapping particles 6 are preferably compounds that may have a mixed valence. Namely, it is preferable that the metal compounds 5 be compounds containing two or more elements of the same type having different atomic valences. Such compounds having a mixed valence change to an electric insulator when heat is generated inside the battery at a rate such as 10 to 100° C./min. Due to the function to change to the electric insulator, electrical resistance of the ion barrier layer 3 is increased at the time of heat generation, so that joule heat generation can be prevented.

For example, titanium nitride generally has a mixed valence derived from a nonstoichiometric composition represented by TiNx. When heat is generated inside the battery, titanium nitride causes a denitrification reaction. In particular, in the case in which the ion barrier layer containing titanium nitride particles is provided at the negative electrode, a denitrification reaction and an oxidation reaction of titanium nitride are both caused, so that titanium oxide (TiOx) of an electric insulator is generated. Accordingly, the titanium oxide increases electrical resistance at the negative electrode, thereby preventing joule heat generation.

Figure 2:
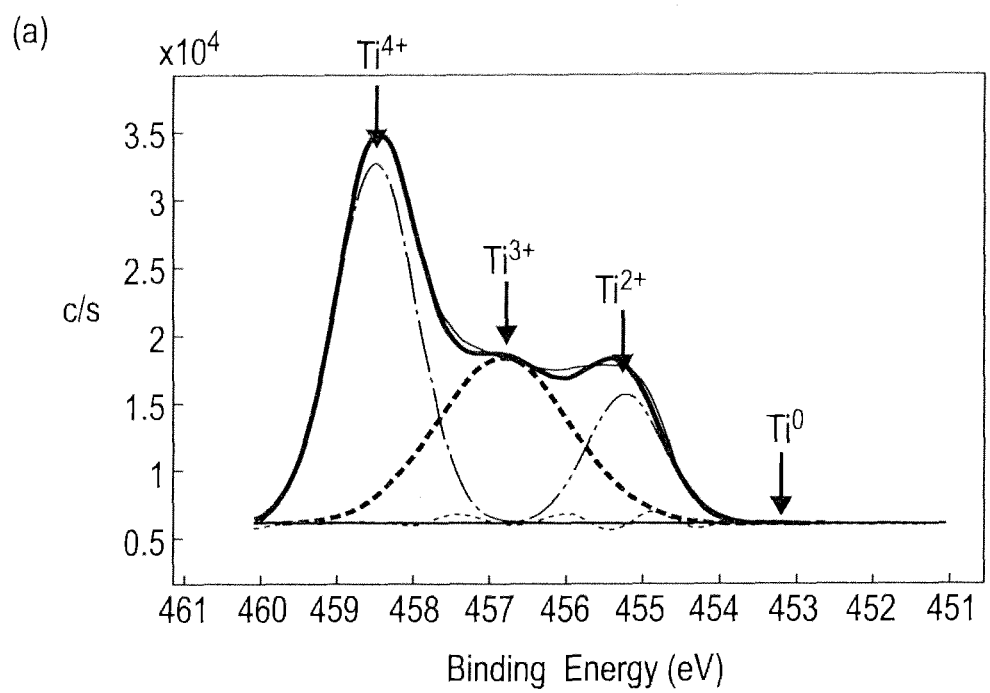
FIG. 2($a$) is an X-ray photoelectron spectrum of titanium atoms in titanium nitride before applying voltage.
Figure 2:
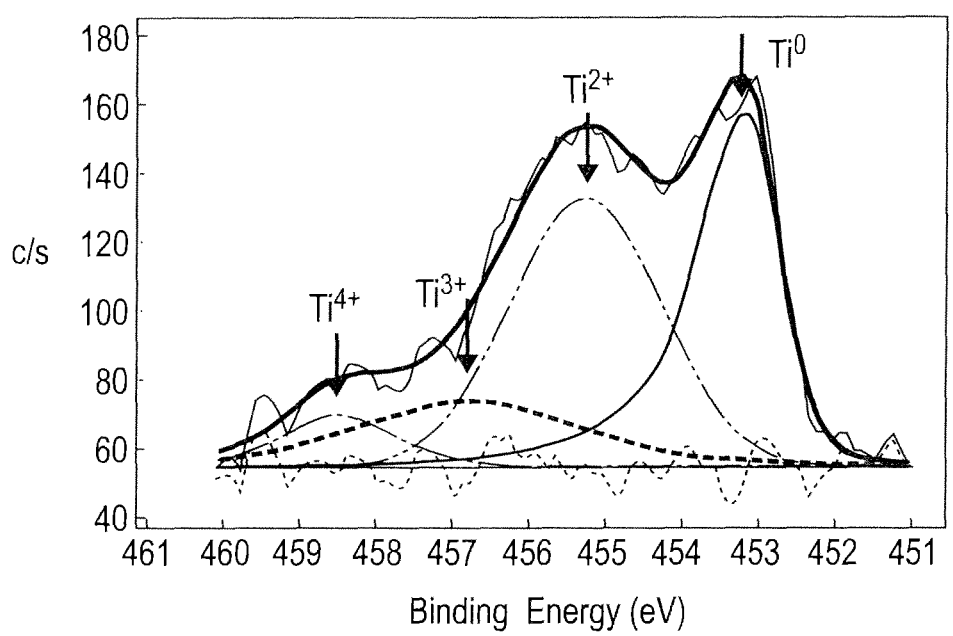

FIG. 2(a) shows an X-ray photoelectron spectrum (XPS) of titanium atoms before applying voltage in titanium nitride and a spectrum after waveform separation. FIG. 2(b) shows an X-ray photoelectron spectrum of titanium atoms after applying voltage in titanium nitride and a spectrum after waveform separation. As shown in FIG. 2(a), titanium has generally divalent, trivalent and tetravalent at the uppermost surface in titanium nitride (TiNx). However, when the ion barrier layer containing titanium nitride is provided at the negative electrode, and is subjected to a reduction state at the time of charge, titanium at the uppermost surface changes to zero-valent, divalent and trivalent, as shown in FIG. 2(b). Further, when heat is generated inside the battery, titanium becomes tetravalent in association with both a denitrification reaction and an oxidation reaction. Such tetravalent titanium changes to titanium oxide ($TiO_2$) of the electric insulator and is thus stabilized due to oxygen in air or oxygen released from a positive electrode active material.

As described above, it is preferable that at least the metal compounds 5 be compounds that may have a mixed valence. However, the whole ion trapping particles 6 may be compounds that may have a mixed valence. Examples of the compounds that have a mixed valence include a nitride of 3d transition metal and a nitride of 4d transition metal. Examples of the 3d transition metal include scandium (Sc), titanium (Ti), vanadium (V), chromium (Cr), manganese (Mn), iron (Fe), cobalt (Co), nickel (Ni), copper (Cu) and zinc (Zn). Examples of the 4d transition metal include yttrium (Y), zirconium (Zr), niobium (Nb), molybdenum (Mo), technetium (Tc), ruthenium (Ru), palladium (Pd), silver (Ag) and cadmium (Cd). Among these, a nitride of Ti, V, Cr, Mn, Fe or Co in the 3d transition metal, and a nitride of Zr in the 4d transition metal are preferable. In particular, titanium nitride (TiNx), zirconium nitride (ZrNx) and chromium nitride (CrNx) are preferable because these compounds have voltage stability in the negative electrode in addition to the above-described characteristics.

The ion barrier layer 3 may be composed of several types of layers that are stacked on, top of each other. Alternatively, the ion barrier layer 3 has a stacked structure including: a layer containing first ion trapping particles in which metal compounds composed of a metallic element and a nonmetallic element are provided on the surfaces of the metal containing particles; and a layer containing second ion trapping particles in which compounds that can have a mixed valence are provided on the surfaces of the metal containing particles. For example, as shown in FIG. 1(*b*), an ion trapping layer 3A in a current collector 1A is a layer composed of first ion trapping particles 6A in which compounds that can have a mixed valence are provided on the surfaces of metal containing particles. Similarly, an ion trapping layer 3B is a layer composed of second ion trapping particles 6B in which metal compounds composed of a metallic element and a nonmetallic element are provided on the surfaces of metal containing particles. Thus, the ion barrier layer may be composed of several types of layers that are stacked on top of each other.

The ion trapping particles 6 may be formed into an arbitrary shape. Examples of the shape of the ion trapping particles 6 include a spherical shape, a cubic shape, a column shape, a plate shape, a scale-like shape, a rod shape, a needle shape, a fiber shape, a plate shape, a cluster shape and an amorphous shape, which may be selected depending on situations. In addition, the ion trapping particles 6 may be in a state of nanoparticles or nanocluster. There are no particular limitations on the particle diameter of the ion trapping particles, but the diameter of the primary particles of the ion trapping particles is preferably within a range of 0.1 nm to 500 nm, more preferably 0.1 nm to 200 nm, still more preferably 0.1 nm to 50 nm. When the primary particle diameter of the ion trapping particles 6 is 0.1 nm or more, the particles 6 may be easily provided on the resin layer 2. Further, when the primary particle diameter of the particles 6 is 500 nm or less, a sufficient specific surface area may be ensured, so that a high effect of adsorbing lithium ions is achieved. In addition, since an electrolysis solution does not easily penetrate the layer from the gaps between the particles 6 adjacent to each other, the ion trapping particles 6 effectively function as a partition wall. The primary particle diameter may be obtained from the observation of the prepared current collector using a scanning electron microscope (SEM) or a transmission electron microscope (TEMP). Note that, the "particle diameter" in the present description represents a maximum distance L of the distances between arbitrary respective two points on the outline of the respective particles.

As described above, the ion barrier layer contains an electrically conductive material containing a nonmetallic element and having a property of preventing penetration of the above-described ions or solvent. The electrically conductive material containing a nonmetallic element has a small density as compared with a material composed of metal. Therefore, a reduction in weight of the current collector can be achieved. The nonmetallic element contained in the electrically conductive material preferably has 5 atom % or more, more preferably 50 atom % or more, in view of a reduction in weight.

The electrically conductive material used in the ion barrier layer in the present embodiment has a large volume resistivity as compared with an electrically conductive material composed of metal since the electrically conductive material of the present embodiment contains a nonmetallic element. Therefore, even when an internal short-circuit is caused, a concentration of the electric current on the short-circuit site is not easily caused. Accordingly, heat generation in the current collector can be prevented. It is to be noted that electrical conductivity in the thickness direction of the current collector may not be obtained when the volume resistivity is excessively large. In consideration of the above-described matter, the volume resistivity of the ion barrier layer is preferably $7.2 \times 10^{-5}$ to 10 Ω·cm, more preferably $1 \times 10^{-4}$ to 5 Ω·cm, still more preferably $1 \times 10^{-3}$ to 1 Ω·cm.

The thickness of the ion barrier layer 3 is preferably within a range of 50 nm to 1000 nm. In addition, as shown in FIG. 1(*b*), in the case of the provision of the plural ion harrier layers in the current collector, the entire thickness of the ion harrier layers is preferably within a range of 50 nm to 1000 nm. As described above, the ion barrier layer contains a metal compound composed of a metal oxide or a metal nitride having an ion adsorption and release capacity. Therefore, even when the thickness is approximately 50 nm to 1000 nm, the ion harrier layer can prevent penetration of ions. The thickness of the ion barrier layer 3 is more preferably within a range of 50 nm to 200 nm, particularly preferably within a range of 50 nm to 100 nm. The thickness of the ion barrier layer 3 and the thickness of the resin layer 2 described below may be measured from the observation of the prepared current collector using SEM or TEM.

Figure 3:
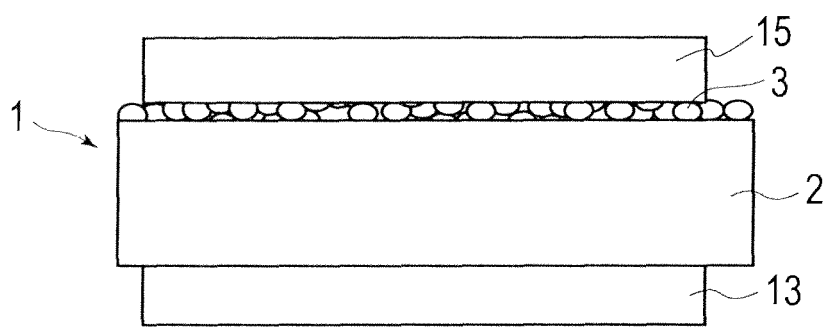
FIG. 3 is a schematic cross-sectional view of a bipolar electrode including a current collector, a positive electrode and a negative electrode according to an embodiment of the present invention.

FIG. 3 is a schematic cross-sectional view of a bipolar battery 23 including the current collector 1 for a secondary battery, a positive electrode active material layer (positive electrode) 13 provided on one surface of the current collector, and a negative electrode active material layer (negative electrode) 15 provided on the other surface of the current collector. As shown in FIG. 3, the ion barrier layer 3 in the current collector 1 is preferably formed on the entire surface of the resin layer 2 so as to be in contact with the negative electrode active material layer 15. Lithium ions in an electrolysis solution usually penetrate inside of the resin layer 2 from the joint surface between the negative electrode active material layer 15 and the resin layer 2. Therefore, due to the provision of the ion barrier layer 3 on the negative electrode active material layer 15 as shown in FIG. 3, the effect of preventing penetration of the lithium ions in the electrolysis solution is enhanced, so as to improve a capacity maintenance rate of the battery.

(Resin Layer)

The resin layer 2 contains a polymer material as a main component. The resin layer 2 contributes to a reduction in weight of the current collector, as well as functioning as an electron transfer medium. In order to obtain the resin layer having electrical conductivity, an electrically conductive polymer may be used, or an electrically conductive material may be added to the resin layer. In the current collector according to the present embodiment, the electrically conductive material may be used as necessary since the ion trapping particles ensure electrical conductivity.

There are no particular limitations on resin used in the resin layer, and a conventionally known electrically non-conductive polymer or electrically conductive polymer may be used. Preferable examples of the electrically non-conductive polymer include polyethylene (PE: high-density polyethylene (HDPE), low-density polyethylene (LDPE)), polypropylene (PP), polyethylene terephthalate (PET), polybutylene terephthalate (PBT), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), silicone resin, cellulose and epoxy resin. These electrically non-conductive polymers have excellent voltage stability or resistance to solvents. In addition, preferable examples of the electrically conductive polymer include polyaniline, polypyrrole, polythiophene, polyacetylene, polyparaphenylene, polyphenylene vinylene, polyacrylonitrile and polyoxadiazole. These electrically conductive polymers have sufficient electrical conductivity without the addition of an electrically conductive material. Therefore, the electrically conductive polymer has an advantage in view of simplicity of a production process and a reduction in weight of the current collector. The above-described electrically non-conductive polymers and electrically conductive polymers may be used independently as a single material, or two or more kinds thereof may be used in combination as a mixture.

The current collector according to the present embodiment particularly preferably contains polyimide as a polymer material used in the resin layer. Since polyimide does not easily adsorb lithium ions, the effect as a polymer material can be achieved significantly.

The resin layer may contain other polymer materials in addition to polyimide. Preferable examples of the other polymer materials include a material having functional group such as amide, an amino group, thioamide, imide, an imino group, ketone, ketene, isocyanate, an acyl group, an acetyl group, a carboxyl group, a carbonyl group, an aldehyde group, acetal, hemiacetal, ester, thioester, phosphate ester, ether, enone, enol, acid anhydride, acid hydrazone, acid azide and a sulfonyl group. The above-mentioned functional groups are not easily decomposed when used in the current collector for a secondary battery. Examples of the polymer materials having such a functional group and stable with respect to an electrolysis solution, voltages and lithium ions include polyamide (PA), polyamide-imide (PAI), polyethylene terephthalate (PET), polybutylene terephthalate (PBT), modified polyphenylene ether (m-PPE, modified PPE, PPO), acrylic resin, polysulfone (PSF), polyether sulfone (PES), amorphous polyarylate (PAR), liquid crystal polymer (LCP) and polyether ether ketone.

The resin layer contains the electrically conductive material as necessary in order to ensure electrical conductivity in a stacking direction. There are no particular limitations on the electrically conductive material to be used as long as the material is a substance having electrical conductivity. Examples of the material having excellent electrical conductivity, voltage stability, or barrier property to lithium ions include metal and a carbon material. In particular, the carbon material has a quite large voltage window, is stable in a wide range with respect to both a positive electrode voltage and a negative electrode voltage, and has excellent electrical conductivity. In addition, the carbon material has a small density as compared with an electrically conductive material containing metal. Therefore, it is appropriate to use the carbon material since a reduction in weight of the current collector can be achieved.

There are no particular limitations on the metal contained in the resin layer, but the resin layer preferably contains one metal or an alloy of metal, or a metal oxide, in which the metal is selected from the group consisting of nickel (Ni), titanium (Ti), aluminum (Al), platinum (Pt), gold (Au), iron (Fe), chromium (Cr), tin (Sn), zinc (Zn), indium (In), antimony (Sb) and potassium (K). These metals have voltage stability in the positive electrode or the negative electrode formed on the surface of the current collector. Among these metals, Ni, Pt, Au and Cr are particularly preferably used.

Specific examples of the alloy contained in the resin layer include stainless steel (SUS), Inconel (registered trademark), Hastelloy (registered trademark), Fe—Cr alloy and Ni—Cr alloy. When these alloys are used, high voltage stability can be achieved.

There are no particular limitations on the carbon material contained in the resin layer, but the resin layer preferably contains at least one material selected from the group consisting of acetylene black, Vulcan (registered trademark), black pearls, carbon nanofiber, Ketjen Black (registered trademark), carbon nanotube, carbon nanohorn, carbon nanoballoon and fullerene. Particularly, the resin layer more preferably contains at least one material selected from the group consisting of carbon nanotube, carbon nanohorn, Ketjen Black, carbon nanoballoon and fullerene. Since these carbon materials have a hollow structure, a surface area per unit mass is large. Therefore, a further reduction in weight of the current collector can be achieved. The above-described electrically conductive materials may be used singly, or two or more kinds thereof may be used in combination.

The size of the electrically conductive material depends on the size and thickness of the resin layer and the configuration of the electrically conductive material. For example, when the electrically conductive material is in a particle state, an average particle diameter of the electrically conductive material is preferably approximately 0.1 μm to 10 μm in view of simplicity of formation of the resin layer. Note that, the value of the "average particle diameter" is calculated as an average value of the particle diameters of the particles observed in several to several tens of fields of vision by used of an observation means such as a scanning electron microscope (SEM) or a transmission electron microscope (TEM).

The content of the polymer material contained in the resin layer is preferably at least 50% by mass or more, more preferably 75% by mass or more, with respect to the total mass of the resin layer. In the case in which the polymer material contained in the resin layer is an electrically conductive polymer, the resin layer may be composed only of the electrically conductive polymer.

The content of the electrically conductive material contained in the resin layer is not particularly limited. However, the content is preferably 5% to 35% by mass, more preferably 5% to 25% by mass, still more preferably 5% to 15% by mass, with respect to the total mass of the polymer material. Due to the addition of the electrically conductive material with the above-described content to the polymer material, sufficient electrical conductivity can be provided to the polymer material while an increase in mass of the resin layer is prevented.

The shape of the electrically conductive material is not particularly limited, and may be properly selected from a particle shape, a fiber shape, a plate shape, a cluster shape, a cloth form and a mesh form. For example, when resin is required to have electrical conductivity over a wide range, it is preferable to use the electrically conductive material in a particle shape. On the other hand, when electrical conductivity of resin is required to be further improved in a specific direction, it is preferable to use the electrically conductive material in a fiber shape so as to have a definite orientation.

The resin layer may contain other additives in addition to the polymer material and the electrically conductive material.

The thickness of the resin layer is not particularly limited, but is preferably within a range of 0.1 μm to 200 μm, more preferably 5 μm to 150 μm, still more preferably 10 μm to 100 μm. When the thickness of the resin layer is 0.1 μm or more, the current collector having a high current collecting performance can be achieved. In addition, when the thickness of the resin layer is 200 μm or less, a battery having a high battery capacity per unit volume can be obtained.

[Method for Manufacturing Current Collector for Secondary Battery]

There are no particular limitations on the method of providing the ion trapping particles 6 on the resin layer 2 having electrical conductivity, and conventional methods such as film formation techniques for a resin thin film and a metal thin film may be properly combined. Examples of the method of providing the ion barrier layer 3 composed of the ion trapping particles 6 on the surface of the resin layer 2 as shown in FIG. 1(a) include sputtering, electrolytic plating, vacuum vapor deposition, CVD, PVD, ion beam vapor deposition, ion plating, atomic layer deposition, laser ablation, non-electrolytic plating, arc spraying and unbalanced magnetron sputtering (UBM). Due to the use of the above-mentioned methods, the ion barrier layer 3 having a high adhesion property to the resin layer 2 can be formed.

In particular, when the sputtering method is used, the ion barrier layer having the thickness described above can be formed efficiently. For example, a material constituting the metal compounds 5 is used as a target material, argon gas particles are made to collide with the target material, and the target material scattered by the impact adheres to the resin layer 2, so that the ion barrier layer 3 is formed. Examples of the target material include an oxide, a nitride, a carbide, a sulfate, a phosphate and a phosphorous compound of at least one metallic element selected from the group consisting of copper, nickel, titanium, chromium, platinum and gold.

Alternatively, the ion barrier layer 3 may be formed by a reactive sputtering method. That is, oxygen or nitrogen may flow into a chamber at the time of sputtering of the metallic element (copper, nickel, titanium, chromium, platinum and gold) constituting the metal compounds 5, so as to form the ion trapping particles composed of an oxide or a nitride of the metal described above.

In addition, a metal layer, which is composed of particles of the metallic element constituting the metal compounds 5, is first formed on the resin layer by a sputtering method. Then, the resin layer provided with the metal layer is left under an oxygen atmosphere (for example, in air). As a result, the surfaces of the metal particles are oxidized, and therefore, the metal containing particles 4 and the metal compounds 5 can be formed. Further, since oxygen is also released from the resin layer 2 due to water and oxygen adsorbed to the resin layer, the surfaces of the metal particles in the ion barrier layer 3 can be oxidized.

As described above, the thickness of the ion barrier layer 3 is preferably within a range of 50 nm to 1000 nm. This is because the thickness within such a range is sufficient to prevent penetration of ions, and the whole surfaces of the metal particles contained in the ion barrier layer can be oxidized due to the thickness within such a range. In addition, when the thickness of the ion barrier layer 3 is adjusted to such a range, and the metal particles are sparsely provided on purpose, metal oxides (metal compounds) can be provided in the entire ion barrier layer 3. Therefore, due to the ion barrier layer 3 having the thickness within a range of 50 nm to 200 nm, preferably within a range of 50 nm to 100 nm, the entire ion barrier layer 3 can be further oxidized. Note that, when the ion barrier layer is formed by a sputtering method by use of the material constituting the metal compounds 5 as a target material as described above, the thickness of the ion barrier layer 3 is not limited to the above-described range.

[Secondary Battery]

The following is a specific explanation of a secondary battery using the current collector for a secondary battery described above. The current collector for a secondary battery according to the present invention is not particularly limited to a laminated (flat) battery, a winding type (cylindrical) battery, and the like, and may be applied to any conventionally known batteries. Similarly, with regard to an electrolyte of a secondary battery, there are no particular limitations on batteries. For example, any batteries such as a liquid electrolyte battery in which a separator is impregnated with a non-aqueous electrolysis solution, a polymer gel electrolyte battery that is also referred to as a polymer battery, and a polymer electrolyte (solid electrolyte) battery may be applied. The polymer gel electrolyte and the polymer electrolyte may be used singly, or a separator impregnated with the polymer gel electrolyte and the polymer electrolyte may be used for a battery.

In addition, the electrode materials for a battery or metal ions moving between the electrodes are not particularly limited, and may be applied to any batteries. Examples of the batteries include a lithium ion secondary battery, a sodium ion secondary battery, a potassium ion secondary battery, a nickel hydrogen secondary battery, a nickel cadmium secondary battery and a nickel hydrogen battery. Among these, a lithium ion secondary battery is preferable. This is because the lithium ion secondary battery has high voltage in cells (single cell layers), achieves a high energy density and high output density, and has an excellent performance as a power source for driving a vehicle and an auxiliary battery.

Figure 4:
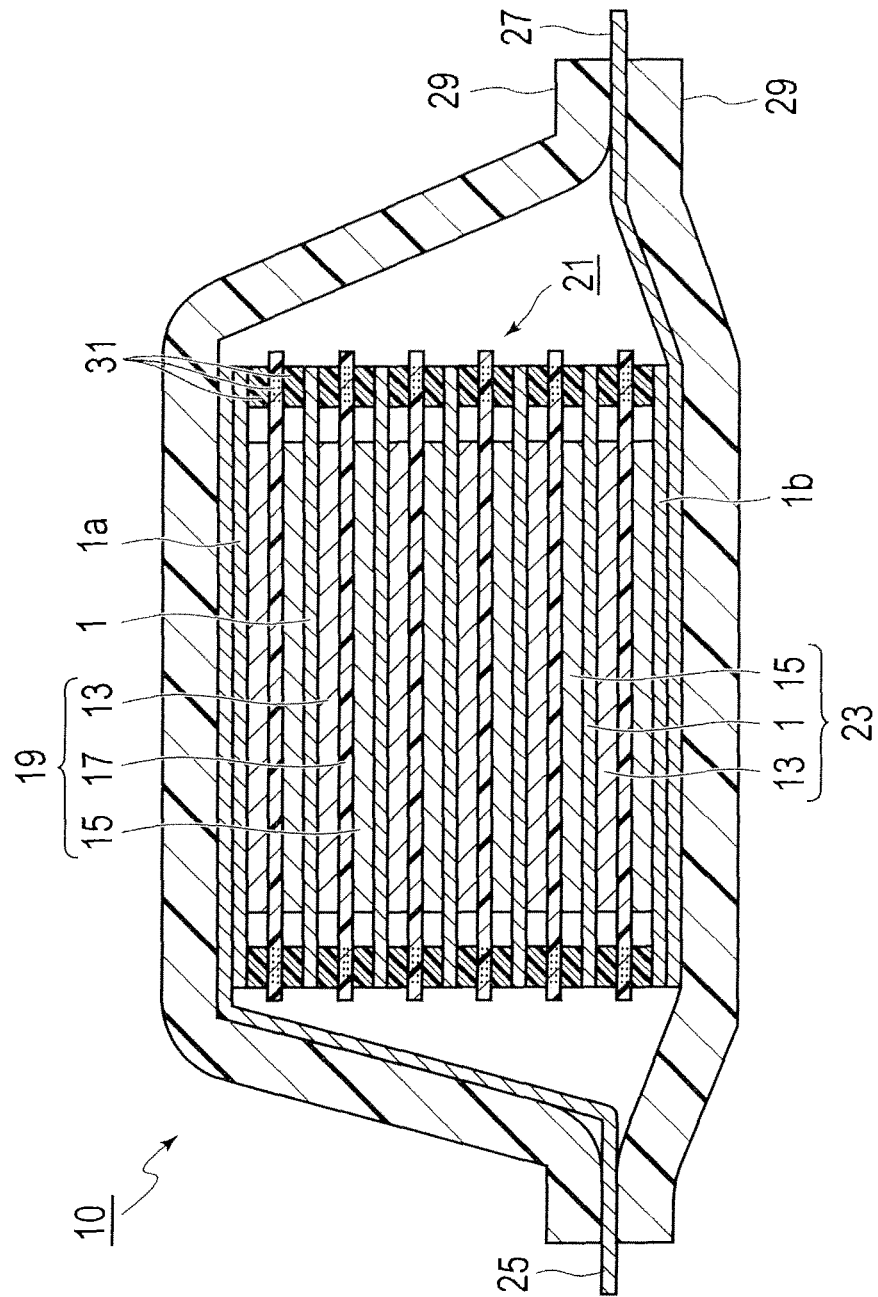
FIG. 4 is a schematic cross-sectional view typically showing an entire structure of a bipolar lithium ion secondary battery.

FIG. 4 is a schematic cross-sectional view typically showing the entire configuration of a bipolar lithium ion secondary battery 10. The bipolar lithium ion secondary battery 10 shown in FIG. 4 has a structure in which a power generating component 21 that is approximately rectangular in shape and occurs an actual charge and discharge reaction is sealed inside a battery casing 29.

As shown in FIG. 4, the power generating component 21 of the bipolar lithium ion secondary battery 10 includes a plurality of bipolar electrodes 23 including the current collector 1, the positive electrode active material layer 13 electrically connected to one surface of the current collector 1, and the negative electrode active material layer 15 electrically connected to the other surface of the current collector 1. The respective bipolar electrodes 23 are stacked on top of each other via electrolyte layers 17 so as to compose the power generating component 21. The respective electrolyte layers 17 have a structure in which an electrolyte is held in the central portion in the plane direction of the separator as a substrate. In the power generating component 21, the respective bipolar electrodes 23 and the respective electrolyte layers 17 are alternately stacked in such a manner that the positive electrode active material layer 13 of one bipolar electrode 23 faces the negative electrode active material layer 15 of another bipolar electrode 23 via the electrolyte layer 17. In other words, each electrolyte layer 17 is provided between the positive electrode active material layer 13 of one bipolar electrode 23 and the negative electrode active material layer 15 of the adjacent bipolar electrode 23.

The positive electrode active material layer 13, the electrolyte layer 17 and the negative electrode active material layer 15 adjacent to each other in this order compose a single cell layer 19. Therefore, the bipolar lithium ion secondary battery 10 is also composed of the single cell layers 19 that are stacked on top of each other. In addition, in order to prevent a liquid junction because of leakage of an electrolysis solution from the electrolyte layers 17, the respective peripheries of the single cell layers 19 are provided with an electric insulator 31. In the power generating component 21, an outermost current collector 1a on the positive electrode located on the outermost layer is provided with the positive electrode active material layer 13 only on one surface of the current collector 1a. Similarly, an outermost current collector 1b on the negative electrode located on the outermost layer of the power generating component 21 is provided with the negative electrode active material layer 15 only on one surface of the current collector 1b. However, the positive electrode active material layer 13 may be provided on both surfaces of the outermost current collector 1a on the positive electrode. Similarly, the negative electrode active material layer 15 may be provided on both surfaces of the outermost current collector 1b on the negative electrode.

In addition, the bipolar lithium ion secondary battery 10 shown in FIG. 4 is provided with a positive electrode current collecting plate 25 adjacent to the outermost current collector 1a at the positive electrode. The positive electrode current collecting plate 25 is extended and pulled out of the battery casing 29. Similarly, a negative electrode current collecting plate 27 is provided adjacent to the outermost current collector 1b at the negative electrode, and extended and pulled out of the battery casing 29.

The bipolar lithium ion secondary battery 10 shown in FIG. 4 is usually provided with the electric insulators 31 at the peripheries of the respective single cell layers 19. The electric insulators 31 are provided so as to prevent the current collectors 1 adjacent to each other from coming into contact with each other inside the battery, and prevent a short-circuit from occurring because of slight unevenness at the end portions of the single cell layers 19 in the power generating component 21. Due to the provision of the electric insulators 31, reliability and safety is ensured for a long period of time, and therefore, the high-quality bipolar lithium ion secondary battery 10 is provided.

The number of the single cell layers 19 to be stacked is adjusted according to voltage to be desired. As long as the bipolar lithium ion secondary battery 10 can maintain sufficient output even if the thickness of the battery is reduced, the number of the single cell layers 19 may be decreased to the maximum. In order to prevent external damages and environmental deterioration at the time of the use of the bipolar lithium ion secondary battery 10, it is preferable to seal the power generating component 21 in the battery casing 29 by reducing pressure, and to pull the positive electrode current collecting plate 25 and the negative electrode current collecting plate 27 out of the battery casing 29. The secondary battery of the present embodiment may be manufactured by a conventional manufacturing method. Hereinafter, the main components other than the current collector in the bipolar lithium ion secondary battery of the present embodiment will be explained.

(Positive Electrode (Positive Electrode Active Material Layer) and Negative Electrode (Negative Electrode Active Material Layer))

The positive electrode active material layer (positive electrode) 13 includes a positive electrode active material. Examples of the positive electrode active material include: a lithium-transition metal composite oxide, such as $LiMn_2O_4$, $LiCoO_2$, $LiNiO_2$, $Li(Ni-Co-Mn)O_2$ and transition metal thereof that is partially substituted by other elements; a lithium-transition metal phosphate compound; and a lithium-transition metal sulfate compound. According to circumstances, two or more positive electrode active materials may be used in combination. Preferably, a lithium-transition metal composite oxide is used as a positive electrode active material in view of a capacity and an output property.

The negative electrode active material layer (negative electrode) 15 includes a negative electrode active material. Examples of the negative electrode active material include a carbon material such as graphite, soft carbon and hard carbon, a metal material such as a lithium-transition metal composite oxide (for example, $Li_4Ti_5O_{12}$), and a lithium alloy series negative electrode material. According to circumstances, two or more negative electrode active materials may be used in combination. Preferably, a carbon material or a lithium-transition metal composite oxide is used as a negative electrode active material in view of a capacity and an output property.

There are no particular limitations on the average particle diameter of the active materials contained in the respective active material layers 13 and 15. However, in view of a high output performance, the average particle diameter is preferably within a range of 3 μm to 25 μm in the positive electrode active material, and is preferably within a range of 1 μm to 50 μm in the negative electrode active material.

The positive electrode active material layer 13 and the negative electrode active material layer 15 may contain a binder. There are no particular limitations on the binder used in the respective active material layers. Examples of the binder include: a thermoplastic polymer such as polyethylene, polypropylene, polyethylene terephthalate (PET), polyether nitrile (PEN), polyacrylonitrile, polyimide, polyamide, cellulose, carboxymethyl cellulose (CMC), an ethylene-vinyl acetate copolymer, polyvinyl chloride, styrene-butadiene rubber (SRR), isoprene rubber, butadiene rubber, ethylene-propylene rubber, an ethylene-propylene-diene copolymer, a styrene-butadiene-styrene block copolymer and a hydrogen additive thereof, and a styrene-isoprene-styrene block copolymer and a hydrogen additive thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoro(alkyl vinyl ether) copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidenefluoride series fluoro rubber such as vinylidenefluoride-hexafluoropropylene series fluoro rubber (VDF-HFP series fluoro rubber), vinylidenefluoridehexafluoropropylene-tetrafluoroethylene series fluoro rubber (VDF-HFP-TFE series fluoro rubber), vinylidenefluoride-pentafluoropropylene series fluoro rubber (VDF-PFP series fluoro rubber), vinylidenefluoride-pentafluoropropylene-tetrafluoroethylene series fluoro rubber (VDF-PFP-TFE series fluoro rubber), vinylidenefluoride-perfluoromethylvinylether-tetrafluoroethylene series fluoro rubber (VDF-PF-MVE-TFE series fluoro rubber), and vinylidenefluoride-chlorotrifluoroethylene series fluoro rubber (VDF-CTFE series fluoro rubber); and epoxy resin. Among these, polyvinylidene fluoride, polyimide, styrene-butadiene rubber, carboxymethyl cellulose, polypropylene, polytetrafluoroethylene, polyacrylonitrile and polyamide are preferable. These preferable binders have excellent heat resistance, have a quite wide voltage window, and are stable with respect to both a positive electrode voltage and a negative electrode voltage. These binders may be used singly, or two or more kinds thereof may be used in combination.

The amount of the binder contained in the active material layer is not particularly limited as long as the amount is sufficient to bind the active materials. The amount of the hinder is preferably within a range of 0.5% to 15% by mass, more preferably within a range of 1% to 10% by mass, with respect to the active material layer.

Examples of other additives that may be contained in the active material layer include a conductive auxiliary agent, electrolyte salt (lithium salt), and an ion conductive polymer.

The conductive auxiliary agent is an additive to improve electrical conductivity of the positive electrode active material layer or the negative electrode active material layer. Examples of the conductive auxiliary agent include a carbon material such as carbon black such as acetylene black, graphite, and vapor-grown carbon fiber. When the active material layer contains the conductive auxiliary agent, an electronic network is formed effectively, so as to improve an output property of the battery.

Examples of the electrolyte salt (lithium salt) include $Li(C_2F_5SO_2)_2N$, $LiPF_6$, $LiBF_4$, $LiClO_4$, $LiAsF_6$ and $LiCF_3SO_3$. Examples of the ion conductive polymer include polyethylene oxide (PEO) polymer and polypropylene oxide (PPO) polymer.

There are no particular limitations on the mixed ratio of the components contained in the positive electrode active material layer and the negative electrode active material layer. The mixed ratio may be properly adjusted according to known findings with regard to a non-aqueous secondary battery. There are also no particular limitations on the thickness of the respective active material layers, and conventionally known findings with regard to a battery may be referred depending on situations. For example, the thickness of the respective active material layers is approximately 2 µm to 100 µm.

(Electrolyte Layer)

An electrolyte constituting the electrolyte layer 17 may be a liquid electrolyte or a polymer electrolyte. The liquid electrolyte is an electrolyte in which lithium salt as supporting salt is dissolved in an organic solvent as a plasticizer. Examples of the organic solvent used as a plasticizer include carbonates such as ethylene carbonate (EC) and propylene carbonate (PC). Examples of the supporting salt (lithium salt) include compounds added to an active material layer of an electrode such as LiBETI.

The polymer electrolyte is divided into a gel electrolyte containing an electrolysis solution and a true polymer electrolyte not containing an electrolysis solution. The gel electrolyte has a configuration in which the liquid electrolyte described above is poured into a matrix polymer composed of an ion conductive polymer. Examples of the ion conductive polymer used as a matrix polymer include polyethylene oxide (PEO), polypropylene oxide (PPO), and copolymers thereof. In such a polyalkylene oxide polymer, electrolyte salt such as lithium salt is easily dissolved.

When the electrolyte layer is composed of the liquid electrolyte or the gel electrolyte, a separator may be used in the electrolyte layer. A specific example of the separator may be a fine pore film composed of polyolefin such as polyethylene and polypropylene.

The true polymer electrolyte has a configuration in which supporting salt (lithium salt) is dissolved in the matrix polymer, but does not contain an organic solvent as a plasticizer. Therefore, when the electrolyte layer is composed of the true polymer electrolyte, liquid leakage from the battery does not occur, and therefore reliability of the battery is improved.

The matrix polymer of the gel electrolyte or the true polymer electrolyte exerts an excellent mechanical strength when a cross-liked structure is formed. In order to form the cross-liked structure, a polymerizable polymer for forming a polymer electrolyte (such as PEO and PPO) may be subjected to polymerization treatment such as thermal polymerization, ultraviolet polymerization, radiation polymerization and electron beam polymerization, using a proper polymerization initiator.

(Outermost Current Collector)

As for the material of the outermost current collectors 1a and 1b, metal and an electrically conductive polymer may be used. In view of ease of extraction of electricity, a metal material is preferably used. Examples of the metal material include aluminum, nickel, iron, stainless steel, titanium and copper. Other than these, a clad material of nickel and aluminum, a clad material of copper and aluminum, or a plating material with a combination of these metals is preferably used. Alternatively, foil in which the surface of metal is covered with aluminum may be used. Among these, aluminum and copper are preferable in view of electron conductivity and cell operation voltage.

(Positive Electrode Current Collecting Plate and Negative Electrode Current Collecting Plate)

There are no particular limitations on the material constituting the respective positive electrode current collecting plate 25 and negative electrode current collecting plate 27, and a conventionally known high conductive material is used. Preferable examples of the constituting material of the current collecting plate include a metal material such as aluminum, copper, titanium, nickel, stainless steel (SUS), and alloys of these metals. Among these, aluminum and copper are particularly preferable in view of lightweight, corrosion resistance and high electrical conductivity. The positive electrode current collecting plate and the negative electrode current collecting plate may contain the same material, or may contain different materials.

(Battery Casing)

As for the battery casing 29, a conventionally known metal can case may be used, as well as a pouched case using a laminate film containing aluminum capable of covering the power generating component. The laminate film may be a three-layered laminate film in which polypropylene (PP), aluminum and nylon are stacked in this order. The laminate film is preferable in view of a high output property and an excellent cooling performance, and a proper use for a large sized battery for EV or HEV.

(Electric Insulator)

The respective electric insulators 31 prevent a liquid junction because of leakage of an electrolysis solution from the electrolyte layers 17. In addition, the respective electric insulators 31 are provided in order to prevent the current collectors adjacent to each other in the battery from coming into contact with, and prevent a short-circuit derived from slight unevenness at the end portions of the single cell layers 19 in the power generating component 21.

The material constituting the electric insulator 31 may be any type of material as long as the material has an electrical insulating property, a sealing property for shedding of a solid electrolyte, a sealing property for external penetration of moisture, and heat resistance under battery operation temperature. Examples of the material of the electric insulator include urethane resin, epoxy resin, polyethylene resin, polypropylene resin, polyimide resin and rubber. Among these, polyethylene resin and polypropylene resin are preferably used as a constitution material of the electric insulator 31 in view of corrosion resistance, resistance to chemicals, ease of manufacture (film manufacturing performance), and cost performance.

Figure 5:
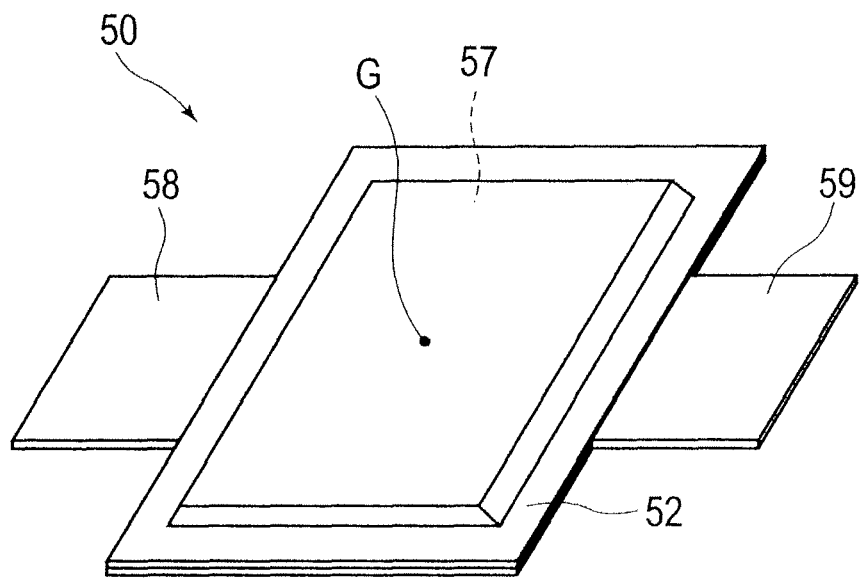
FIG. 5 is a perspective view showing an external appearance of a bipolar lithium ion secondary battery.

FIG. 5 is a perspective view showing an external appearance of a laminated flat bipolar lithium ion secondary battery as a typical secondary battery. As shown in FIG. 5, a laminated flat lithium ion secondary battery 50 has a flat rectangular shape, and a positive electrode current collecting plate 58 and a negative electrode current collecting plate 59 from which power is extracted are pulled out of both sides of the battery. A power generating component (battery component) 57 is enclosed in a battery casing 5 of the ion secondary battery 50, and the periphery of the battery casing 52 is thermally sealed. The power generating component (battery component) 57 is sealed while the positive electrode current collecting plate 58 and the negative electrode current collecting plate 59 are pulled out of the battery. The power generating component (battery component) 57 corresponds to the power generating component (battery component) 21 of the bipolar lithium ion secondary battery 10 shown in FIG. 4 as described above.

The lithium ion battery is not limited to a laminated flat shape. A winding type lithium ion battery may be formed in a cylindrical shape, or may be formed in a flat rectangular shape that is derived from this cylindrical shape. The cylindrical shape may be formed by use of a laminate film as an outer material, or by use of a conventional cylindrical can (metal can). In particular, the power generating component (battery component) is preferably covered with an aluminum laminate film as a casing. Due to such a configuration, a reduction in weight of the battery can be achieved.

There are also no particular limitations on the method of extraction of the current collecting plates 58 and 59 shown in FIG. 5. The positive electrode current collecting plate 58 and the negative electrode current collecting plate 59 may be pulled out of the same side. Alternatively, the positive electrode current collecting plate 58 and the negative electrode current collecting plate 59 may be respectively divided into sections and pulled out of the respective sides. In the winding type lithium ion battery, the respective terminals may be formed by use of a cylindrical can (metal can) instead of the current collecting plate.

The lithium ion battery described above can be properly used as a large capacity power source for an electric vehicle, a hybrid electric vehicle, a fuel cell vehicle, and a hybrid fuel cell vehicle.

EXAMPLES

Hereinafter, the present invention will be explained in more detail with reference to the examples. However, the present invention is not limited to these examples.

Example I-1

(1) Manufacturing Current Collector

10% by mass of carbon particles (a primary particle diameter of 20 nm) as an electrically conductive material was dispersed with respect to 100% by mass of polyimide as a polymer material. A film resin layer having a thickness of 50 μm was prepared. More specifically, polyimide containing polyamic acid was dissolved in N-methylpyrrolidone (NMP) as a solvent, and the carbon particles were further dispersed therein, so as to manufacture a film by a molten cast method. Thus, a resin layer having electrical conductivity was obtained.

Thereafter, copper oxide particles were deposited with a thickness of 200 nm on one surface of the resin layer by a sputtering method, so as to manufacture a current collector. The current collector thus obtained was observed by TEM to recognize that the spherical particles having a primary particle diameter of 50 nm to 150 nm were deposited.

(2) Manufacturing Battery

First, hard carbon (90% by mass) as a negative electrode active material and polyvinylidene fluoride (PVdF) (10% by mass) as a binder were prepared. Then, a certain amount of N-methylpyrrolidone (NMP) as a slurry viscosity adjusting solvent was added to these solid contents, so as to prepare negative electrode active material slurry.

In addition, spinel lithium manganate (LiMnO$_4$) (85% by mass) as a positive electrode active material, acetylene black (5% by mass) as a conductive auxiliary agent, and PVdF (10% by mass) as a binder were prepared. Then, a certain amount of NMP as a slurry viscosity adjusting solvent was added to these solid contents, so as to prepare positive electrode active material slurry.

Subsequently, the negative electrode active material slurry was applied to the surface of the current collector manufactured above on which the copper oxide particles were provided, followed by drying to form a negative electrode active material layer having a thickness of 30 μm. Then, the positive electrode active material slurry was applied to the surface of the current collector opposite to the surface provided with the negative electrode active material layer, followed by drying to form a positive electrode active material layer having a thickness of 30 μm. Thus, a bipolar electrode was manufactured.

Thereafter, 20 mm of the circumferential portions of the positive electrode active material layer and the negative electrode active material layer of the bipolar electrode were peeled, so as to expose the surface of the current collector. In this case, the area of the negative electrode active material layer to be formed and the area of the positive electrode active material layer to be formed were adjusted to be the same, and the respective projection figures of the negative electrode active material layer and the positive electrode active material layer on the current collector were adjusted to correspond with each other.

As an electrolysis solution, a solution in which LiPF$_6$ as lithium salt was dissolved with a concentration of 1 M in a mixed liquid of propylene carbonate (PC) and ethylene carbonate in the same volume was prepared.

The two bipolar electrodes manufactured above were laminated via a separator in such a manner that the positive electrode active material layer and the negative electrode active material layer faced each other. Thus, a laminated body was manufactured. Then, the three sides of the laminated body were sealed to be pouched. Subsequently, an electrolysis solution was poured from one open side into a gap between the positive electrode and the negative electrode facing each other, and the one open side was then sealed under vacuum. Thus, a one-layer bipolar lithium ion secondary battery was manufactured.

Comparative Example I-1

A bipolar lithium ion secondary battery was manufactured in a similar manner to Example I-1, except that only the resin layer obtained in the process of manufacturing the current collector in Example I-1 was used as the current collector.

Comparative Example I-2

The resin layer obtained in the process of manufacturing the current collector in Example I-1 and copper foil having a thickness of 5 μm were thermally compressed by a batch hot pressing machine at 120° C. and 3 MPa for 10 minutes, so as to manufacture a current collector. Then, a bipolar lithium ion secondary battery was manufactured by use of the current collector thus obtained in a similar manner to Example I-1.

<Evaluation>

With respect to the batteries manufactured in Example I-1 and Comparative Examples I-1 and I-2, a charge and discharge test was carried out. In the charge and discharge test, first, the respective batteries were fully charged at constant current (CC) of 80 mA, and were then charged at constant voltage (CV). The total time of charge was 10 hours. Thereafter, the respective batteries were discharged at constant current (CC) and constant voltage (CV) of 80 mA, followed by discharge at constant current. This process was defined as one cycle, and this cycle was repeatedly carried out at 25° C. (cycle test).

Table 1 is a result of the cycle test showing a discharge capacity maintenance rate after 10 cycles (discharge capacity after 10 cycles/initial discharge capacity). Note that, the battery manufactured in Comparative Example I-2 could not be evaluated because contact resistance between the resin layer having electrical conductivity and the copper foil was large.

TABLE 1

| | Current Collector | Capacity Maintenance Rate after 10 Cycles |
|---|---|---|
| Example I-1 | Resin Layer/ Copper Oxide Particles | 0.95 |
| Comparative Example I-1 | Resin Layer | 0.83 |
| Comparative Example I-2 | Resin Layer/ Copper Foil | — |

According to the result shown in Table 1, it was revealed that the battery in Example I-1 using the current collector including the resin layer having electrical conductivity and the copper oxide particles has a higher capacity maintenance rate as compared with the battery in Comparative Example I-1 only using the resin layer as the current collector. This may be because the adsorption of the lithium ions in the current collector was suppressed due to the copper oxide particles, and a decrease in capacity of the battery derived from the adsorbed lithium ions was suppressed. In addition, in the current collector used in Example I-1, an increase in resistance in the stacking direction of the current collector is suppressed as compared with the current collector used in Comparative Example I-2. As a result, a decrease in battery performance can be prevented in Example I-1.

Example II-1

(1) Manufacturing Current Collector

Polyimide as a polymer material and carbon particles (Ketjen black) as an electrically conductive material were mixed, so as to prepare a film resin layer in a similar manner to Example I-1

Thereafter, titanium nitride particles (TiNx) were deposited with a thickness of 100 nm on one surface of the resin layer by a reactive sputtering method, so as to manufacture a current collector. Note that, nitrogen gas ($N_2$) and argon gas (Ar) were included in a chamber so as to form titanium nitride while titanium was used as the target material.

(2) Manufacturing Battery

First, the current collector was cut into 9 $cm^2$ pieces. The cut current collector was placed to face lithium foil in such a manner that the ion barrier layer and lithium faced each other via the separator. Then, an electrolysis solution was poured therein, so as to manufacture a battery. As for the electrolysis solution, a solution in which $LiPF_6$ as lithium salt was dissolved with a concentration of 1 M in a mixed liquid of propylene carbonate (PC) and ethylene carbonate in the same volume was used.

Example II-2

A current collector was manufactured in a similar manner to Example II-1, except that titanium nitride particles (TiNx) were deposited with a thickness of 100 nm on the resin layer by a reactive sputtering method. Thereafter, a battery was manufactured by use of the current collector thus obtained in a similar manner to Example II-1. In the case of Example II-2, the amount of nitrogen gas in the chamber was adjusted so as to increase the amount of nitrogen to react with titanium as compared with Example II-1. Note that, in Table 2, the component in the ion barrier layer in Example II-1 under the condition of the decrease in the amount of nitrogen gas is indicated by "TiNx-L", and the component in the ion barrier layer in Example II-2 under the condition of the increase in the amount of nitrogen gas is indicated by "TiNx-H".

Example II-3

First, a chromium oxide particle layer with a thickness of 50 nm and a copper oxide particle layer with a thickness of 100 nm were formed on the resin layer by a sputtering method. Then, a layer of nickel phosphide Ni—P with a thickness of 1000 nm was formed on the copper oxide particle layer by plating, so as to manufacture a current collector. Thereafter, a battery was manufactured by use of the current collector thus obtained in a similar manner to Example II-1.

Example II-4

A current collector was manufactured in a similar manner to Example II-1, except that titanium oxide particles were deposited with a thickness of 100 nm on the resin layer by a sputtering method. Thereafter, a battery was manufactured by use of the current collector thus obtained in a similar manner to Example II-1.

Example II-5

A current collector was manufactured in a similar manner to Example II-1, except that copper oxide particles were deposited with a thickness of 100 nm on the resin layer by a sputtering method. Thereafter, a battery was manufactured by use of the current collector thus obtained in a similar manner to Example II-1.

Example II-6

A current collector was manufactured in a similar manner to Example II-1, except that chromium oxide particles were deposited with a thickness of 100 nm on the resin layer by a sputtering method. Thereafter, a battery was manufactured by use of the current collector thus obtained in a similar manner to Example II-1.

Example II-7

A current collector was manufactured in a similar manner to Example II-1, except that chromium nitride particles ($Cr_2N$) were deposited with a thickness of 100 nm on the resin layer by a reactive sputtering method. Thereafter, a battery was manufactured by use of the current collector thus obtained in a similar manner to Example II-1.

Example II-8

A current collector was manufactured in a similar manner to Example II-1, except that chromium nitride particles ($Cr_2N$) were deposited with a thickness of 100 nm on the resin layer by a reactive sputtering method. Thereafter, a battery was manufactured by use of the current collector thus obtained in a similar manner to Example II-1. In the case of Example II-8, the amount of nitrogen gas in the chamber was adjusted so as to decrease the amount of nitrogen to react with chromium as compared with Example II-7. Note that, in Table 2, the component in the ion barrier layer in Example II-7 under the condition of the increase in the amount of nitrogen gas is indicated by "$Cr_2N$—H", and the component in the ion barrier layer in Example II-8 under the condition of the decrease in the amount of nitrogen gas is indicated by "$Cr_2N$-L".

Example II-9

A current collector was manufactured in a similar manner to Example II-1, except that chromium nitride particles (CrN) were deposited with a thickness of 100 nm on the resin layer. Thereafter, a battery was manufactured by use of the current collector thus obtained in a similar manner to Example II-1.
<Evaluation>
By use of a charge and discharge device, voltages were applied to the batteries of Examples II-1 to II-9. Then, a final voltage in the respective examples was measured. With regard to the measurement condition, first, constant current discharge at a current value of 1 mA was carried out so that voltage was decreased to 60 mV. Subsequently, constant current-constant voltage discharge was carried out at a current value of 100 μA and a voltage value of 50 mV for 16 hours. In the measurement, the constant current-constant voltage discharge was controlled so that the voltage was decreased to 50 mV after the voltage reached 60 mV. However, the voltage was increased at the timing of the voltage shift. The result thereof is shown as spontaneous voltage in Table 2.

TABLE 2

| | Component in Ion Barrier Layer | Thickness of Ion Barrier Layer (nm) | Final Potential (V) | Spontaneous Potential (V) |
|---|---|---|---|---|
| Example II-1 | TiNx—L | 100 | 0.05 | 0.49 |
| Example II-2 | TiNx—H | 100 | 0.05 | 0.46 |
| Example II-3 | Ni—P/$Cu_2O$/$Cr_2O_3$ | 1150 | 0.05 | 0.45 |
| Example II-4 | $TiO_2$ | 100 | 0.11 | 0.72 |
| Example II-5 | $Cu_2O$ | 100 | 0.14 | 0.52 |
| Example II-6 | $Cr_2O_3$ | 100 | 0.18 | 0.58 |
| Example II-7 | $Cr_2N$—H | 100 | 0.04 | 0.51 |
| Example II-8 | $Cr_2N$—L | 100 | 0.04 | 0.50 |
| Example II-9 | CrN | 100 | 0.045 | 0.53 |

In this evaluation, it can be determined that a voltage response performance is better as the time to reach 60 mV at the constant current discharge is faster. In addition, it can be determined that stability at low voltage with respect to lithium is higher as the final voltage is closer to the designated value of 50 mV. Further, it is recognized in the evaluation that the final voltage is lower as the time to reach 60 mV at the constant current discharge is faster. As shown in Table 2, the batteries in Examples II-1 to II-9 have the final voltage close to the designated value of 50 mV. In particular, in the case in which the component in the ion barrier layer is the nitride or the phosphide such as Examples II-1 to II-3 and Examples II-7 to II-9, the final voltage is particularly close to 50 mV. Therefore, it is recognized that stability at low voltage with respect to lithium is high in the respective ion barrier layers in Examples II-1 to II-9.

In addition, the batteries in Examples II-1 to II-9 show the spontaneous voltage value of 0.4 V or more. It is considered that the material is closer to the state of lithium ions, that is, responsiveness (chemical bond) to lithium ions is higher, as the spontaneous voltage is closer to 0 V. As shown in Table 2, the batteries in Examples II-1 to II-9 have the relatively high spontaneous voltage values. Accordingly, it is recognized that there is almost no chemical bond of the material in the ion barrier layer to lithium in Examples II-1 to II-9 and the material in the ion barrier layer is stable in a low voltage region.

When the batteries (TiNx) in Examples II-1 and II-2 are compared with the battery ($TiO_2$) in Example II-4, the spontaneous voltages of the batteries in Examples II-1 and II-2 are lower. This may be because the lithium ions were attracted to the surfaces of the ion trapping particles, so that the voltage slightly came close to lithium.

Example III-1

(1) Manufacturing Current Collector

Polyimide as a polymer material and carbon particles (Ketjen black) as an electrically conductive material were mixed, so as to prepare a film resin layer with a thickness of 50 μm in a similar manner to Example I-1. Thereafter, copper oxide particles were deposited with a thickness of 200 nm on one surface of the resin layer by a sputtering method, so as to manufacture a current collector.

(2) Manufacturing Battery

The negative electrode active material slurry prepared in Example I-1 was applied to the surface of the current collector on which the copper oxide particles were provided, followed by drying at 80° C. to form a negative electrode active material layer having a thickness of 30 μm. Then, the positive electrode active material slurry prepared in Example I-1 was applied to the surface of the current collector opposite to the surface provided with the negative electrode active material layer, followed by drying at 80° C. to form a positive electrode active material layer having a thickness of 30 μm. Thus, a bipolar electrode in this example was manufactured.

Thereafter, 20 mm of the circumferential portions of the positive electrode active material layer and the negative electrode active material layer of the bipolar electrode were peeled, so as to expose the surface of the current collector. The two bipolar electrodes were laminated via a separator in such a manner that the positive electrode active material layer and the negative electrode active material layer faced each other. Thus, a laminated body was manufactured. Then, the three sides of the laminated body were sealed to be pouched. Subsequently, the electrolysis solution prepared in Example I-1 was poured from one open side into a gap between the positive electrode and the negative electrode facing each other, and the one open side was then sealed under vacuum. Thus, a one-layer bipolar lithium ion secondary battery was manufactured.

Example III-2

A bipolar lithium ion secondary battery was manufactured in a similar manner to Example III-1, except that chromium oxide particles were deposited with a thickness of 200 nm on the resin layer by a sputtering method.

Example III-3

A bipolar lithium ion secondary battery was manufactured in a similar manner to Example III-1, except that titanium oxide particles were deposited with a thickness of 200 nm on the resin layer by a sputtering method.

Example III-4

A bipolar lithium ion secondary battery was manufactured in a similar manner to Example III-1, except that titanium nitride particles were deposited with a thickness of 100 nm on the resin layer by a reactive sputtering method.

Example III-5

A bipolar lithium ion secondary battery was manufactured in a similar manner to Example III-1, except that titanium nitride particles were deposited with a thickness of 50 nm on the resin layer by a reactive sputtering method. In the case of Example III-5 the amount of nitrogen gas in the chamber was adjusted so as to decrease the amount of nitrogen to react with, titanium as compared with Example III-4. Note that, in Table 3, the component in the ion barrier layer in Example III-4 under the condition of the increase in the amount of nitrogen gas is indicated by "TiNx-H", and the component in the ion barrier layer in Example III-5 under the condition of the decrease in the amount of nitrogen gas is indicated by "TiNx-L".

Example III-6

First, a chromium oxide particle layer with a thickness of 50 nm and a copper oxide particle layer with a thickness of 100 nm were formed on the resin layer by a sputtering method. Then, a layer of nickel phosphide (Ni—P) with a thickness of 1000 nm was formed on the copper oxide particle layer by plating, so as to manufacture a current collector. Thereafter, a battery was manufactured by use of the current collector thus obtained in a similar manner to Example III-1.

Example III-7

A bipolar lithium ion secondary battery was manufactured in a similar manner to Example III-1, except that chromium nitride particles ($Cr_2N$) were deposited with a thickness of 100 nm on the resin layer by a reactive sputtering method.

Example III-8

A bipolar lithium ion secondary battery was manufactured in a similar manner to Example III-1, except that chromium nitride particles ($Cr_2N$) were deposited with a thickness of 100 nm on the resin layer by a reactive sputtering method. In the case of Example III-8, the amount of nitrogen gas in the chamber was adjusted so as to decrease the amount of nitrogen to react with chromium as compared with Example III-7. Note that, in Table 3, the component in the ion barrier layer in Example III-7 under the condition of the increase in the amount of nitrogen gas is indicated by "$Cr_2N$—H", and the component in the ion barrier layer in Example III-8 under the condition of the decrease in the amount of nitrogen gas is indicated by "$Cr_2N$-L".

Example III-9

A bipolar lithium ion secondary battery was manufactured in a similar manner to Example III-1, except that chromium nitride particles ($Cr_2N$) were deposited with a thickness of 50 nm on the resin layer in a similar manner to Example III-7.

Example III-10

A bipolar lithium ion secondary battery was manufactured in a similar manner to Example III-1, except that chromium nitride particles ($Cr_2N$) were deposited with a thickness of 50 nm on the resin layer in a similar manner to Example III-8.

Example III-11

A bipolar lithium ion secondary battery was manufactured in a similar manner to Example III-1, except that chromium nitride particles (CrN) were deposited with a thickness of 100 nm on the resin layer by a reactive sputtering method.
<Evaluation>

The respective batteries manufactured in Examples III-1 to III-11 were subjected to charge and discharge at 0.1 C (8 mA), followed by degassing in the batteries to carry out a content confirmation at 25° C. and 1 C. Subsequently, the cycle test was carried out with respect to the batteries other than Example III-5 at 25° C. and the battery in Example III-5 at 45° C. In the cycle test, the batteries were first charged to 4.2 V at constant current and constant voltage at 1 C (80 mA) current for 2.5 hours in total, followed by discharge to 2.5 V at constant current. This process was defined as one cycle, and this cycle was repeatedly carried out 50 times. Then, the capacity at the first discharge after degassing in the battery was defined as 1, and the rate of the discharge capacity at the 50th cycle was defined as a capacity maintenance rate. Table 3 shows the capacity maintenance rate in the respective examples.

TABLE 3

|  | Component in Ion Barrier Layer | Thickness of Ion Barrier Layer (nm) | Capacity Maintenance Rate after 50 Cycles (%) |
| --- | --- | --- | --- |
| Example III-1 | $Cu_2O$ | 200 | 82 |
| Example III-2 | $Cr_2O_3$ | 200 | 82 |
| Example III-3 | $TiO_2$ | 200 | 83 |
| Example III-4 | TiNx—H | 100 | 89 |
| Example III-5 | TiNx—L | 50 | 92 |
| Example III-6 | Ni—P/$Cu_2O$/$Cr_2O_3$ | 1150 | 93 |
| Example III-7 | $Cr_2N$—H | 100 | 86 |
| Example III-8 | $Cr_2N$—L | 100 | 87 |
| Example III-9 | $Cr_2N$—H | 50 | 89 |
| Example III-10 | $Cr_2N$—L | 50 | 88 |
| Example III-11 | CrN | 100 | 86 |

According to Table 3, the respective batteries in Examples III-1 to III-11 indicate the capacity maintenance rate of 80% or more. In particular, the batteries in Examples III-5 and III-6 indicate the capacity maintenance rate as high as 90% or more. It is considered that this is because the ion trapping particles according to the present invention have excellent voltage stability, and the lithium ions do not easily reach the resin layer due to the mutual interaction between the ion trapping particles and the lithium ions.

Figure 6:
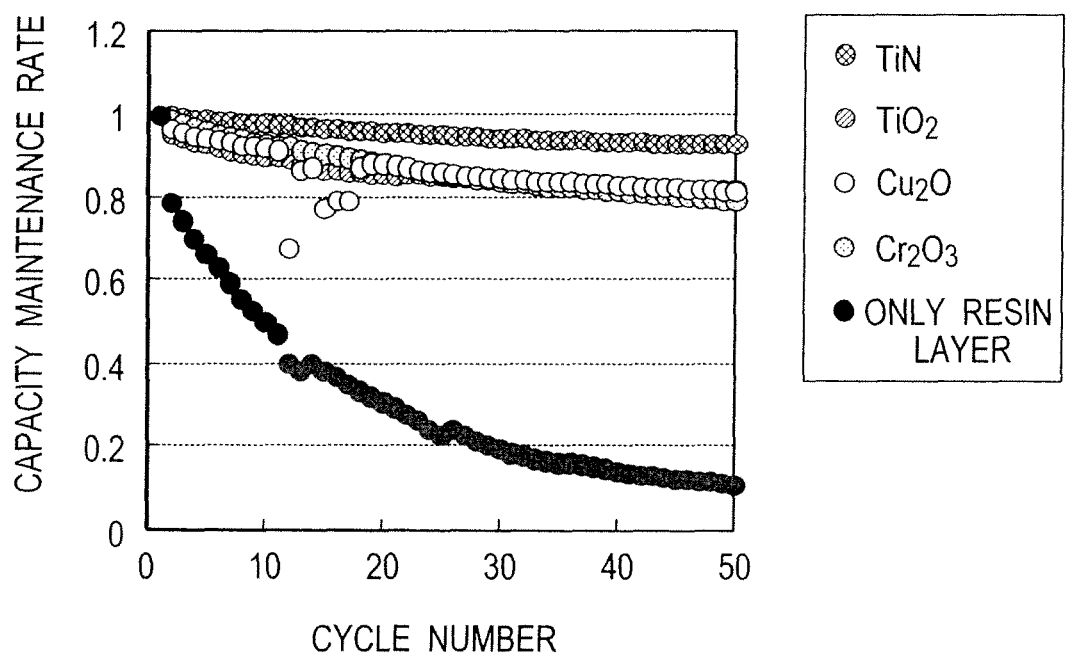
FIG. 6 is a graph showing a relationship between a cycle number and a capacity maintenance rate of each battery in Examples III-1, III-2, III-3 and III-5, and a battery using only a resin layer as a current collector.

FIG. 6 shows a relationship between the cycle number and the capacity maintenance rate in the respective batteries in Examples III-1 ($Cu_2O$), III-2 ($Cr_2O_3$), III-3 ($TiO_2$) and III-5 (TiN), and the battery using only the resin layer as the current collector. As shown in FIG. 6, the batteries in the respective examples are prevented from a decrease in the capacity maintenance rate even when the cycle number is increased. On the other hand, with regard to the current collector that does not include the ion barrier layer but includes only the resin layer, the capacity maintenance rate is significantly decreased in association with the increase in the cycle number, and becomes 10% at the 50th cycle. It is considered that this is because the lithium ions are adsorbed to the current collector, and the movement of the lithium ions is not carried out efficiently between the electrodes. Thus, a decrease in battery performance may be caused.

Example IV

Polyimide as a polymer material and carbon particles (Ketjen black) as an electrically conductive material were mixed, so as to prepare a plurality of film resin layers with a thickness of 50 μm in a similar manner to Example I-1. Thereafter, titanium oxide particles ($TiO_2$) were deposited with a thickness of 20 nm and with a thickness of 200 nm on one surface of each of the two resin layers by a sputtering method, so as to manufacture two current collectors.

In addition, titanium nitride particles (TiNx-H) were deposited with a thickness of 20 nm and with a thickness of 200 nm on one surface of each of the other two resin layers by a reactive sputtering method, so as to manufacture two current collectors. Note that, when the titanium nitride particles were manufactured, the chamber was controlled to have a large amount of nitrogen gas.

Further, titanium nitride particles (TiNx-L) were deposited with a thickness of 20 nm and with a thickness of 200 nm on one surface of each of the still other two resin layers by a reactive sputtering method, so as to manufacture two current collectors. Note that, when the titanium nitride particles were manufactured, the chamber was controlled to have a small amount of nitrogen gas.

Figure 7:
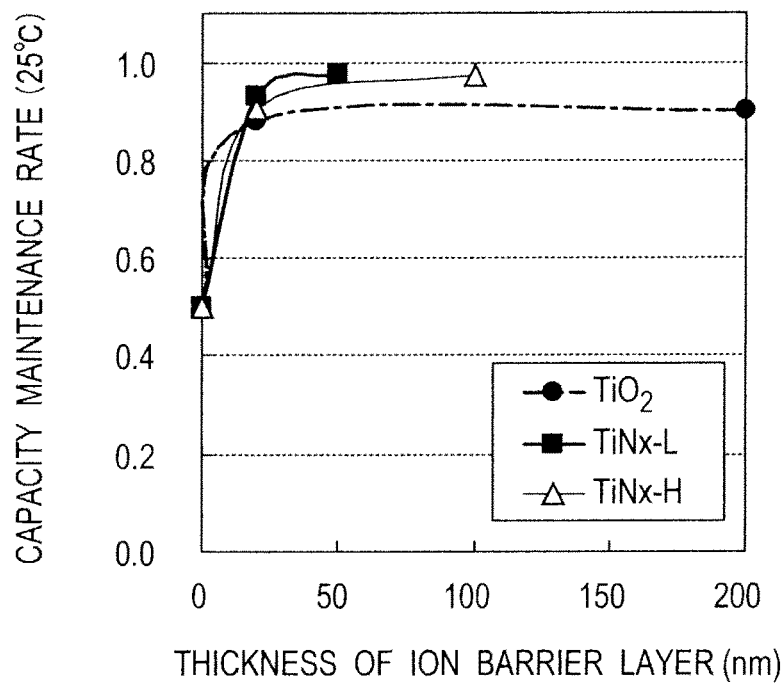
FIG. 7 is a graph showing a relationship between a capacity maintenance rate and a thickness of an ion barrier layer in Example IV.

By use of the six current collectors thus manufactured and the current collector that does not include the ion harrier layer but includes only the resin layer, the respective bipolar lithium ion secondary batteries were manufactured in a similar manner to Example III-1. In addition, the cycle test similar to Examples III-1 to III-11 was carried out to measure the capacity maintenance rate of this example. Note that, the cycle number in this example was not 50 cycles, but 10 cycles. FIG. 7 shows the measurement result. In FIG. 7, the vertical axis represents a rate of a discharge capacity at the 10th cycle in the case in which the first discharge capacity is defined as 1, and the horizontal axis represents a thickness of the ion barrier layer. According to FIG. 7, the tendency that the capacity maintenance rate is saturated when the thickness of the ion barrier layer is 50 nm or more was confirmed. Accordingly, it was revealed that the thickness of the ion barrier layer on the resin layer is preferably 50 nm or more.

Example V-1

(1) Manufacturing Current Collector

Polyimide as a polymer material and carbon particles (Ketjen black) as an electrically conductive material were mixed, so as to prepare a film resin layer with a thickness of 50 μm in a similar manner to Example I-1. Thereafter, copper oxide particles were deposited with a thickness of 50 nm on one surface of the resin layer by a sputtering method, so as to manufacture a current collector.

(2) Manufacturing Battery

First, graphite (MCMB) (90 parts by mass) as a negative electrode active material and PVdF (10 parts by mass) as a binder were prepared. Subsequently, a certain amount of M-methyl-2-pyrrolidone (NMP) as a slurry viscosity adjusting solvent was added to these solid contents, so as to prepare negative electrode active material slurry.

In addition, $LiNiO_2$ (85 parts by mass) as a positive electrode active material, acetylene black (5 parts by mass) as a conductive auxiliary agent, and PVdF (10 parts by mass) as a binder were prepared. Then, a certain amount of NMP as a slurry viscosity adjusting solvent was added to these solid contents, so as to prepare positive electrode active material slurry.

The negative electrode active material slurry thus prepared was applied to one surface of the negative electrode current collector (on the surface on which the ion harrier layer was provided) by use of a coating apparatus, followed by drying and press treatment by use of a roll pressing device, so as to form a negative electrode active material layer (a thickness of 91 μm). Then, the positive electrode active material slurry thus prepared was applied to the resin surface of the current collector (on the surface on which the ion barrier layer was not provided) by use of a coating apparatus, followed by drying and press treatment by use of a roll pressing device, so as to form a positive electrode active material layer (a thickness of 76 μm).

Subsequently, fine fiber film made of aramid (a thickness of 30 μm) as a separator was prepared. In addition, a solution in which $LiPF_6$ as lithium salt was dissolved with a concentration of 1 M in a mixed liquid of ethylene carbonate (EC) and ethyl methyl carbonate (MEC) in the same volume was prepared.

The nine bipolar electrodes and the eight separators manufactured above, and the sealing materials of which the electrode portions were taken out (PP/PEN/PP (20 μm/30 μm/20 μm)) were sequentially stacked in such a manner that the respective positive electrode active material layers and negative electrode active material layers faced each other via the separators. Thus, a power generating component was manufactured.

Thereafter, a flexible member for a voltage monitor was interposed in the power generating component, the three sides were thermally sealed, and the electrolysis solution was poured from the one open side, followed by sealing. The power generating component thus obtained was enclosed in a battery casing made of an aluminum laminate sheet, so as to complete the bipolar lithium ion secondary battery.

Example V-2

A current collector was manufactured in a similar manner to Example V-1, except that titanium oxide particles were deposited with a thickness of 50 nm on the resin layer by a sputtering method. Thereafter, a bipolar lithium ion secondary battery was manufactured by use of the current collector thus obtained in a similar manner to Example V-1.

Example V-3

A current collector was manufactured in a similar manner to Example V-1, except that titanium nitride particles were deposited with a thickness of 50 nm on the resin layer by a reactive sputtering method. Thereafter, a bipolar lithium ion secondary battery was manufactured by use of the current collector thus obtained in a similar manner to Example V-1.

Example V-4

A current collector was manufactured in a similar manner to Example V-1, except that zirconium nitride particles were deposited with a thickness of 50 nm on the resin layer by a reactive sputtering method. Thereafter, a bipolar lithium ion secondary battery was manufactured by use of the current collector thus obtained in a similar manner to Example V-1.

Example V-5

A current collector was manufactured in a similar manner to Example V-1, except that chromium nitride particles were deposited with a thickness of 50 nm on the resin layer by a reactive sputtering method. Thereafter, a bipolar lithium ion secondary battery was manufactured by use of the current collector thus obtained in a similar manner to Example V-1.

Comparative Example V-1

By use of stainless steel foil (SUS foil) with a thickness of 20 μm as the current collector, a bipolar lithium ion secondary battery was manufactured in a similar manner to Example V-1.

<Evaluation (Confirmation Test for Increase in Temperature During Discharge by Short-Circuit Test)>

The respective batteries in Examples V-1 to V-5 and Comparative Example V-1 were fully charged (4.2 V: battery terminal voltage) at 0.5 C at the first charge after the assembly, and then subjected to aging for two days while the full charge state was maintained. The total voltage at the first charge was 33.6 V. Then, the batteries were discharged to 2.5 V (battery terminal voltage) at 1 C at the first discharge, and the capacities of the batteries were measured. The total voltage at the first discharge was 20.0 V. Subsequently, the batteries were fully charged at 0.5 C, and then, an electrically conductive member (metal needle) with a diameter of 3 mm was allowed to penetrate through the central portion of the respective batteries as a short-circuit test. Thereafter, the batteries were discharged to 2.5 V (battery terminal voltage) at 100 C to measure the battery surface temperature during the discharge. The battery surface temperature was a maximum value of the increased battery temperature measured in such a manner that a thermocouple was attached to the central portion (the portion indicated by the reference sign G in FIG. 5) on the laminate casing of the respective batteries. Table 4 shows the measurement result. In Table 4, the maximum temperatures in Examples V-1 to V-5 were indicated by relative temperatures when the maximum temperature of Comparative Example V-1 was defined as 1.

TABLE 4

| | Current Collector | Relative Temperature |
|---|---|---|
| Example V-1 | Conductive Polyimide/$Cu_2O$ | 0.6 |
| Example V-2 | Conductive Polyimide/$TiO_2$ | 0.6 |
| Example V-3 | Conductive Polyimide/TiN | 0.1 |
| Example V-4 | Conductive Polyimide/ZrN | 0.2 |
| Example V-5 | Conductive Polyimide/$Cr_2N$ | 0.4 |
| Comparative Example V-1 | SUS Foil | 1 |

According to Table 4, when copper oxide and titanium oxide were used in the ion barrier layer, the increase in temperature could be decreased by 40% as compare with the SUS foil. This may be because a generation of joule heat was prevented due to electrical resistance of the copper oxide and the titanium oxide. In addition, when titanium nitride, zirconium nitride and chromium nitride were used in the ion barrier layer, the increase in temperature could be decreased by 60% or more as compared with the SUS foil. That is, a denitrification reaction and an oxidation reaction of titanium nitride, zirconium nitride and chromium nitride were caused at the time of the increase in temperature, and therefore, an electric insulator of copper oxide, titanium oxide or chromium oxide was formed. As a result, electrical resistance of the current collector was increased, and a generation of joule heat was prevented. Accordingly, the increase in battery temperature may be suppressed.

Figure 8:
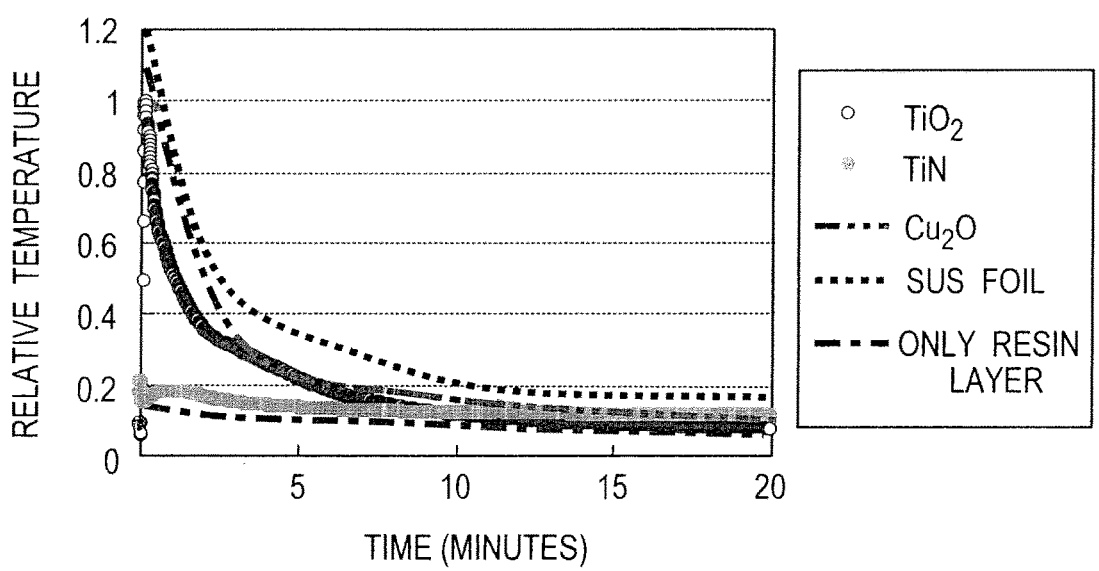
FIG. 8 is a graph showing a relationship between a relative temperature and a time of each battery in Examples V-1, V-2 and V-3 and Comparative Example V-1, and a battery using only a resin layer as a current collector.

FIG. 8 shows a relationship between the relative temperature and the time of the respective batteries in Examples V-1 ($Cu_2O$), V-2 ($TiO_2$), and V-3 ($TiN_x$) and Comparative Example V-1 (SUS foil), and the battery using only the resin layer as the current collector. In FIG. 8, the vertical axis represents the relative temperature in the case in which the maximum value of the increased temperature in Example V-2 ($TiO_2$) is defined as 1. With regard to the horizontal axis, when the electrically conductive member is allowed to penetrate through the central portion of the battery, the time to start discharging at 100 C is defined as 0. As shown in FIG. 8, in the case of Comparative Example V-1, the maximum value of the increased temperature exceeded 1.2 and further increased to 1.6 or more immediately after starting discharging. Thus, it is obvious that the increase in temperature at the time of short-circuit is extremely high. On the other hand, in the case of Examples, the increase in temperature could be suppressed to a low level as compared with Comparative Example. In particular, in the case of Example V-3 ($TiN_x$), since the increase in temperature is extremely low, it is recognized that safety at the time of short-circuit is ensured. The increase in temperature in the case in which only the resin layer was used as the current collector is also low. However, as shown in FIG. 6, since the current collector only with the resin layer has a low capacity maintenance rate, a battery performance cannot be maintained.

Example V-6

(1) Manufacturing Current Collector

Polyimide (PI) as a polymer material and carbon particles (Ketjen black) as an electrically conductive material were mixed, so as to prepare a film resin layer with a thickness of 20 μm in a similar manner to Example I-1. Thereafter, copper oxide particles were deposited with, a thickness of 100 nm on both surfaces of the resin layer by a sputtering method, so as to manufacture a negative electrode current collector.

In addition, a film resin layer with a thickness of 20 μm was prepared as described above. Then, aluminum particles were deposited with a thickness of 100 nm by a sputtering method, so as to manufacture a positive electrode current collector.

(2) Manufacturing Battery

Positive electrode active material slurry and negative electrode active material slurry were prepared in a similar manner to Example V-1. The negative electrode active material slurry thus prepared was applied on both surfaces of the negative electrode current collector by use of a coating apparatus, followed by drying and press treatment by use of a roll pressing device, so as to form negative electrode active material layers (a thickness of 75 μm for each surface) on both surfaces of the negative electrode current collector. Then, the negative electrode current collector thus obtained was cut into 10 cm×5 cm pieces, and a negative electrode current collecting plate made of nickel was welded to the cut negative electrode current collector, so as to manufacture a negative electrode.

In addition, the positive electrode active material slurry thus prepared was applied on both surfaces of the positive electrode current collector by use of a coating apparatus, followed by drying and press treatment by use of a roll pressing device, so as to form positive electrode active material layers (a thickness of 110 μm for each surface) on both surfaces of the positive electrode current collector. Then, the positive electrode current collector thus obtained was cut into 9.5 cm×4.5 cm pieces, and a positive electrode current collecting plate made of aluminum was welded to the cut positive electrode current collector, so as to manufacture a positive electrode.

A fine pore film made of polyethylene (thickness: 30 μm, size: 10.5 cm×5.5 cm) was prepared as a separator. In addition, a solution in which $LiPF_6$ as lithium salt was dissolved with a concentration of 1 M in a mixed liquid of ethylene carbonate (EC) and diethyl carbonate (DMC) in the same volume was prepared.

The eleven positive electrodes, the ten negative electrodes and the eleven separators manufactured above were sequentially stacked in such a manner that the positive electrode active material layer and the negative electrode active material layer of the positive electrode and the negative electrode faced each other via the separator, respectively. Thus, a power generating component was manufactured.

Subsequently, the power generating component thus obtained was enclosed in a battery casing made of an aluminum laminate sheet in such a manner that a part of the respective positive electrode current collecting plate and negative electrode current collecting plate was pulled out of the battery casing. Thereafter, the electrolysis solution was poured thereinto, followed by sealing. Thus, the laminated lithium ion battery shown in FIG. 5 was completed.

(3) Manufacturing Assembled Battery

Figure 9:
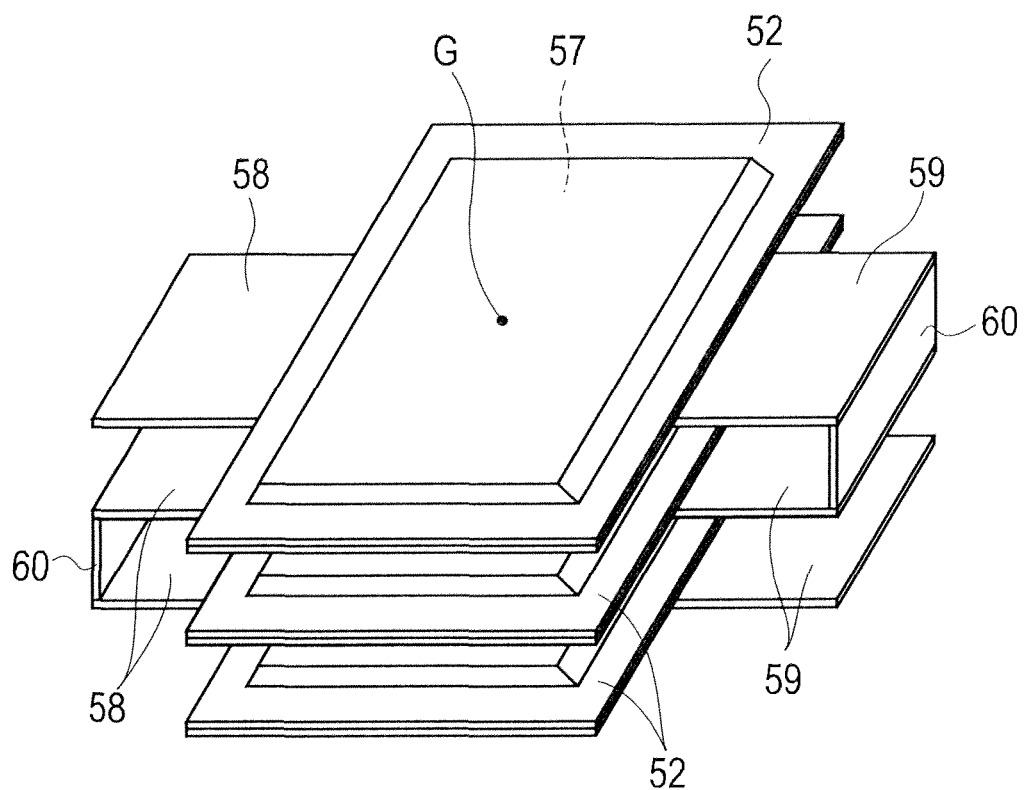
FIG. 9 is a perspective view showing a structure of an assembled battery in Example V.

The three lithium ion batteries obtained above were connected in series using battery connecting bus bars 60 as shown in FIG. 9 so as to manufacture an assembled battery, which was subjected to the short-circuit test as described below.

Example V-7

First, copper oxide particles were deposited with a thickness of 100 nm on both surfaces of the film resin layer having a thickness of 20 μm used in Example I-5 by a sputtering method. Subsequently, titanium nitride particles were deposited with a thickness of 100 nm on the copper oxide particle layer by a reactive sputtering method, so as to manufacture a negative electrode current collector. Then, an assembled battery was manufactured by use of the negative electrode current collector thus obtained in a similar manner to Example V-6.

Example V-8

First, copper oxide particles were deposited with a thickness of 100 nm on both surfaces of the film resin layer having a thickness of 20 μm used in Example I-5 by a sputtering method. Subsequently, zirconium nitride particles were deposited with a thickness of 100 nm on the copper oxide particle layer by a reactive sputtering method, so as to manufacture a negative electrode current collector. Then, an assembled battery was manufactured by use of the negative electrode current collector thus obtained in a similar manner to Example V-6.

Comparative Example V-2

An assembled battery was manufactured in a similar manner to Example V-6, except that copper foil with a thickness of 10 μm was used as the negative electrode current collector.

<Evaluation (Confirmation Test for Increase in Temperature During Discharge by Short-Circuit Test)>

The assembled batteries in Examples V-6 to V-8 and Comparative Example V-2 were fully charged (4.2 V: battery terminal voltage) at the first charge at 0.5 C after the assembly, and then subjected to aging for one week while the full charge state was maintained. Then, the respective assembled batteries were discharged to 2.0 V (battery terminal voltage) at 1 C at the first discharge, and the capacities of the assembled batteries were measured. Subsequently, the respective assembled batteries were fully charged at 0.5 C, and then, an electrically conductive member (metal needle) with a diameter of 3 mm was allowed to entirely penetrate through the respective assembled batteries as a short-circuit test. Thereafter, the assembled batteries were discharged to 2.0 V (battery terminal voltage) at 100 C to measure the battery surface temperature during the discharge. The battery surface temperature was a maximum value of the increased battery temperature measured in such a manner that a thermocouple was attached to the central portion (the portion indicated by the reference sign G in FIG. 9) on the laminate casing of the respective assembled batteries. Note that, in the respective assembled batteries, the thermocouple was attached to all the three batteries, and an average value of the maximum values of the increased temperature of the respective batteries was defined as the battery surface temperature. Table 5 shows the test result.

TABLE 5

| | Positive Electrode Current Collector | | Negative Electrode Current Collecting Foil | | Relative Temperature |
|---|---|---|---|---|---|
| | Material | Thickness (μm) | Material | Thickness (μm) | |
| Example V-6 | Al/PI/Al | 1/20/1 | Cu$_2$O/PI/Cu$_2$O | 0.1/20/0.1 | 0.9 |
| Example V-7 | Al/PI/Al | 1/20/1 | TiN/Cu$_2$O/PI/Cu$_2$O/TiN | 0.1/0.1/20/0.1/0.1 | 0.6 |
| Example V-8 | Al/PI/Al | 1/20/1 | ZrN/Cu$_2$O/PI/Cu$_2$O/ZrN | 0.1/0.1/20/0.1/0.1 | 0.7 |
| Comparative Example V-2 | Al/PI/Al | 1/20/1 | Copper Foil | 10 | 1 |

According to Table 5, when the copper oxide was used in the ion barrier layer, the increase in temperature could be decreased by approximately 10% as compare with the copper foil. This may be because a generation of joule heat was prevented due to electrical resistance of the copper oxide and titanium oxide. In addition, when titanium nitride and zirconium nitride in addition to copper oxide were used in the ion barrier layer, the increase in temperature could be decreased by 30% or more as compared with the copper foil. This may also be because titanium oxide and zirconium oxide were formed at the time of the increase in temperature, and as a result, the increase in battery temperature was prevented, as in the case of Examples V-3, and V-4.

The entire contents of Japanese Patent Application No. P2009-095196 (filed on Apr. 9, 2009) and Japanese Patent Application No. P2009-251112 (filed on Oct. 30, 2009) are herein incorporated by reference.

Although the present invention has been described above by reference to the embodiment and the examples, the present invention is not limited to those, and it will be apparent to these skilled in the art that various modifications and improvements can be made. In particular, FIG. 1(a) shows the embodiment in which the ion barrier layer of the current collector is in contact with the electrode. However, other layers may be interposed between the ion barrier layer and the electrode.

In the above description, the mechanism to block ions in the current collector according to the present invention was explained, in which the ions do not easily reach the resin layer since the metal compounds in the ion barrier layer adsorb the ions. However, there is no influence on the scope of the present invention even when the current collector of the present invention contributes to the prevention of adsorption of ions due to other mechanisms.

INDUSTRIAL APPLICABILITY

According to the present invention, the ion barrier layer physically prevents from the entry of ions at the time of charge, and the metal compounds on the surfaces of the ion trapping particles interact with the ions, so that the ions do not easily reach the resin layer. Therefore, the ion adsorption in the current collector including the resin layer having electrical conductivity can be decreased.

REFERENCE SIGNS LIST

1 Current collector
2 Resin layer
3 Ion barrier layer
4 Metal containing particles
5 Metal compounds
6 Ion trapping particles

The invention claimed is:

1. A current collector for a secondary battery, comprising:
a film resin layer having electrical conductivity; and
an ion barrier layer provided on a surface of the film resin layer, the ion barrier layer consisting of ion trapping particles in which metal compounds are provided on surfaces of metal containing particles, the ion trapping particles being continuously provided from an interface between the film resin layer and the ion barrier layer toward a surface of the ion barrier layer,
wherein a diameter of primary particles of the ion trapping particles is within a range of 0.1 nm or more and less than 500 nm,
wherein a thickness of the ion barrier layer is within a range of 50 nm to 1000 nm.

2. The current collector for a secondary battery according to claim 1, wherein the metal containing particles are pure metal particles composed of a single metallic element, alloy particles composed of a plurality of metallic elements, or metal compound particles composed of a metallic element and a nonmetallic element.

3. The current collector for a secondary battery according to claim 1, Wherein the metal containing particles contain at least one metallic element selected from the group consisting of copper, nickel, titanium, chromium, platinum and gold.

4. The current collector for a secondary battery according to claim 2, wherein the metal compound particles contain at least one compound selected from the group consisting of a metal oxide, a metal nitride, a metal carbide, a metal sulfate, a metal phosphate and a metal phosphorous compound.

5. The current collector for a secondary battery according to claim 1, wherein the metal compounds contain at least one compound selected from the group consisting of a metal oxide, a metal nitride, a metal carbide, a metal sulfate, a metal phosphate and a metal phosphorous compound.

6. The current collector for a secondary battery according to claim 5, wherein the metal compounds are composed of metal oxide.

7. The current collector for a secondary battery according to claim 1, wherein the metal containing particles are particles composed of one of copper, titanium and chromium, and the metal compounds are composed of an oxide of a metallic element constituting the metal containing particles.

8. The current collector for a secondary battery according to claim 1, wherein the metal containing particles are metal compound particles, and
the metal compound particles and the metal compounds in the ion trapping particles are composed of an identical material.

9. The current collector for a secondary battery according to claim 8, wherein the ion trapping particles are composed of nickel phosphide.

10. The current collector for a secondary battery according to claim 1, wherein each of the metal compounds is a compound that can have a mixed valence.

11. The current collector for a secondary battery according to claim 10, wherein the compound that can have the mixed valence is a nitride of a 3d transition element or a 4d transition element.

12. The current collector for a secondary battery according to claim 11, wherein the nitride of the 3d transition element or the 4d transition element is titanium nitride, chromium nitride or zirconium nitride.

13. The current collector for a secondary battery according to claim 1, wherein the ion barrier layer comprises a stacked structure including: a layer containing first ion trapping particles in which metal compounds composed of a metallic element and a nonmetallic element are provided on the surfaces of the metal containing particles; and a layer containing second ion trapping particles in which compounds that can have a mixed valence are provided on the surfaces of the metal containing particles.

14. The current collector for a secondary battery according to claim 1, wherein the film resin layer contains polyimide.

15. A secondary battery, comprising:
the current collector for the secondary battery according to claim 1;
a positive electrode formed on one surface of the current collector;
a negative electrode formed on another surface of the current collector, the negative electrode being provided on a surface at the ion barrier layer in the current collector for the secondary battery; and
an electrolyte layer interposed between the positive electrode and the negative electrode.

16. The secondary battery according to claim 15, wherein the secondary battery is a bipolar lithium ion secondary battery.

17. The current collector for a secondary battery according to claim 1, wherein a thickness of the film resin layer is within a range of 0.1 µm to 200 µm.

18. A current collector for a secondary battery, comprising:
a film resin layer having electrical conductivity; and
an ion barrier layer provided on a surface of the film resin layer, the ion barrier layer consisting of a plurality of ion trapping particles in which metal compounds are provided on surfaces of metal containing particles, the ion trapping particles being continuously connected to each other from an interface in which the film resin layer is in contact with the ion barrier layer toward a surface of the ion barrier layer on an opposite side of the interface,
wherein a diameter of primary particles of the ion trapping particles is within a range of 0.1 nm or more and less than 500 nm,
wherein a thickness of the ion barrier layer is within a range of 50 nm to 1000 µm.

19. The current collector for a secondary battery according to claim 18, wherein a thickness of the film resin layer is within a range of 0.1 µm to 200 µm.

20. A current collector for a secondary battery, comprising:
a film resin layer having electrical conductivity; and
an ion barrier layer provided on a surface of the film resin layer, the ion barrier layer consisting of:
ion trapping particles in which metal compounds are provided on surfaces of metal containing particles, the ion trapping particles being continuously provided from an interface between the film resin layer and the ion barrier layer toward a surface of the ion barrier layer; and
a substance which prevents intrusion of lithium ions into an inside of the film resin layer,
wherein a diameter of primary particles of the ion trapping particles is within a range of 0.1 nm or more and less than 500 nm,
wherein a thickness of the ion barrier layer is within a range of 50 nm to 1000 nm.

21. A current collector for a secondary battery, comprising:
a film resin layer having electrical conductivity; and
an ion barrier layer provided on a surface of the film resin layer, the ion barrier layer consisting of:
a plurality of ion trapping particles in which metal compounds are provided on surfaces of metal containing particles, the ion trapping particles being continuously connected to each other from an interface in which the film resin layer is in contact with the ion barrier layer toward a surface of the ion barrier layer on an opposite side of the interface; and
a substance which prevents intrusion of lithium ions into an inside of the film resin layer,
wherein a diameter of primary particles of the ion trapping particles is within a range of 0.1 nm or more and less than 500 nm,
wherein a thickness of the ion barrier layer is within a range of 50 nm to 1000 nm.

22. A current collector for a secondary battery, comprising:
a film resin layer having electrical conductivity; and
an ion barrier layer provided on a surface of the film resin layer, the ion barrier layer consisting of ion trapping particles in which metal compounds are provided on surfaces of metal containing particles, the ion trapping particles being continuously provided from an interface between the film resin layer and the ion barrier layer toward a surface of the ion barrier layer,
wherein a thickness of the ion barrier layer is within a range of 50 nm to 1000 nm.

* * * * *